(12) United States Patent
Paek et al.

(10) Patent No.: US 9,754,479 B2
(45) Date of Patent: Sep. 5, 2017

(54) REMOTE CONTROL OF A MOBILE COMPUTING DEVICE WITH AN AUXILIARY DEVICE

(71) Applicant: Microsoft Corporation, Redmond, WA (US)

(72) Inventors: Timothy Seung Yoon Paek, Sammamish, WA (US); John Helmes, Limburg (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 14/314,354

(22) Filed: Jun. 25, 2014

(65) Prior Publication Data
US 2015/0379866 A1 Dec. 31, 2015

(51) Int. Cl.
*H04M 1/725* (2006.01)
*G08C 17/02* (2006.01)
*H04W 4/00* (2009.01)

(52) U.S. Cl.
CPC .......... *G08C 17/02* (2013.01); *H04M 1/7253* (2013.01); *H04W 4/005* (2013.01); *G08C 2201/30* (2013.01); *G08C 2201/93* (2013.01)

(58) Field of Classification Search
None
See application file for complete search history.

(56) References Cited

U.S. PATENT DOCUMENTS

| | | | |
|---|---|---|---|
| 6,952,617 B1 | 10/2005 | Kumar | |
| 7,813,715 B2 | 10/2010 | McKillop et al. | |
| 8,081,964 B1 | 12/2011 | Enzmann et al. | |
| 8,414,349 B2 | 4/2013 | Boman et al. | |
| 8,634,873 B2 | 1/2014 | Jones et al. | |
| 2006/0068851 A1 | 3/2006 | Ashman, Jr. | |
| 2008/0004003 A1 | 1/2008 | Wulff et al. | |
| 2009/0061841 A1 | 3/2009 | Chaudhri et al. | |
| 2011/0306393 A1 | 12/2011 | Goldman et al. | |
| 2012/0080465 A1* | 4/2012 | Son | B60R 11/02 224/276 |
| 2014/0045480 A1 | 2/2014 | Hsieh et al. | |
| 2014/0233752 A1* | 8/2014 | Seo | H04M 1/035 381/74 |

FOREIGN PATENT DOCUMENTS

EP     1473913 A1    11/2004

OTHER PUBLICATIONS

Oxygen Audio, "O Car Owner's Manual", 2010.*

(Continued)

*Primary Examiner* — Daniell L Negron
(74) *Attorney, Agent, or Firm* — Medley, Behrens & Lewis, LLC

(57) ABSTRACT

An auxiliary device that remotely controls a mobile computing device is described herein. The auxiliary device can be wirelessly coupled with the mobile computing device. The auxiliary device can detect a user input at the auxiliary device. An operation executed by the mobile computing device can be performed responsive to the user input. Further, an identity of the operation can be a function of a context of the mobile computing device and the user input. Responsive to detection of the user input, the auxiliary device can transmit data indicative of the user input from the auxiliary device to the mobile computing device.

20 Claims, 14 Drawing Sheets

(56) References Cited

OTHER PUBLICATIONS http://www.cnet.com/news/oxygen-audio-debuts-car-stereo-with-iphone-interface/, "Oxygen Audio debuts car stereo with iPhone interface", Nov. 17, 2010.*
Honda, Technology Reference Guide 2013 Accord Sedan Touring, Sep. 22, 2012, http://techinfo.honda.com/rjanisis/pubs/QS/2A13TRQS.pdf, pp. 24, 25, 31, 32, and 35.*
"Samsung Introduces Galaxy Gear, a Wearable Device to Enhance the Freedom of Mobile Communications", Retrieved at: <<http://xavierstuder.com/wp-content/uploads/2013/09/130904_SAM_GALAXY_Gear.pdf>>, Sep. 4, 2013, 4 Pages.
Anthony, Sebastian, "Google's Modular Smartphone, Project Ara, Could Go on Sale Next Year for $50", Retrieved at: <<http://www.extremetech.com/extreme/177708-googles-modular-smartphone-project-ara-could-go-on-sale-next-year-for-50>>, Mar. 3, 2014, 4 Pages.
Hakkens, Dave, "Phonebloks", Retrieved at: <<https://phonebloks.com/en/goals>>, Jan. 2013, 2 Pages.
"International Search Report & Written Opinion Received for PCT Application No. PCT/US2015/037295", Mailed Date: Oct. 5, 2015, 10 Pages.

* cited by examiner

REMOTE CONTROL OF A MOBILE COMPUTING DEVICE WITH AN AUXILIARY DEVICE

BACKGROUND

Mobile computing devices are prevalent in today's society. Many conventional mobile computing devices combine features that were traditionally provided by separate devices. For instance, previously it was common for someone to carry a feature phone to place and receive phone calls, a camera to capture pictures or videos, as well as other discrete devices to perform various functions. In contrast, many of today's mobile computing devices perform a variety of operations. Examples of such operations commonly effectuated by a mobile computing device include capturing images or videos (e.g., with an embedded camera of the mobile computing device), making or receiving phone calls, replaying various types of media (e.g., videos, music, audio, etc.), providing directions (e.g., navigation), performing searches (e.g., web searching, etc.), receiving, composing, and sending emails and text messages, reviewing and editing documents, executing various applications, and so forth.

SUMMARY

Described herein are various technologies that pertain to operating an auxiliary device, where the auxiliary device is wirelessly coupled with a mobile computing device. A user input can be detected at the auxiliary device. An operation executed by the mobile computing device can be performed responsive to the user input. For instance, the operation can be an operation of a personal assistant component executed by the mobile computing device. Further, an identity of the operation can be a function of a context of the mobile computing device and the user input. Responsive to detection of the user input, data indicative of the user input can be transmitted from the auxiliary device to the mobile computing device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
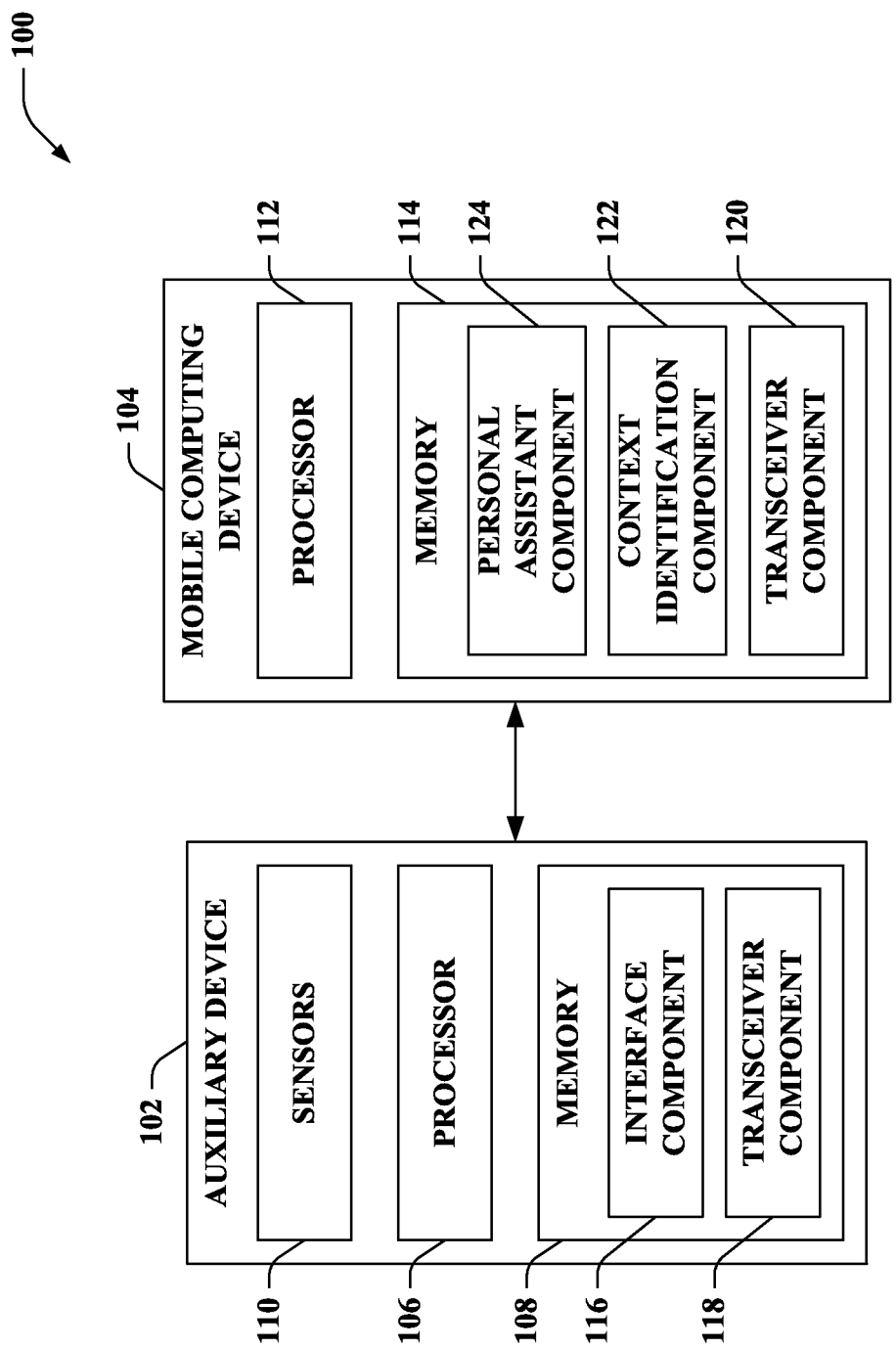
FIG. 1 illustrates a functional block diagram of an exemplary system that includes an auxiliary device that remotely controls a mobile computing device.

Various technologies pertaining to remotely controlling a mobile computing device using an auxiliary device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that includes an auxiliary device 102 that remotely controls a mobile computing device 104. The auxiliary device 102 and the mobile computing device 104 are wirelessly coupled. The auxiliary device 102 includes a processor 106 and a memory 108. The processor 106 is configured to execute instructions loaded into the memory 108 (e.g., one or more components loaded into the memory 108 are executable by the processor 106). As described in greater detail herein, the memory 108 includes instructions configured to remotely control the mobile computing device 104 (e.g., an operation executed by the mobile computing device 104 can be performed responsive to a user input received by the auxiliary device 102).

The auxiliary device 102 further includes sensors 110. While the auxiliary device 102 is described as including a plurality of sensors 110, it is contemplated that the auxiliary device 102 can include one sensor. The auxiliary device 102 can include one or more differing types of sensors 110. Examples of types of the sensors 110 include a touch sensor, a microphone, a position sensor, an inertial measurement unit (e.g., a gyroscope, an accelerometer, etc.), a hover sensor, a camera, and so forth.

According to various examples, the auxiliary device 102 can include one or more microcontrollers. A microcontroller can be an integrated circuit that includes a processor core and a memory. For example, the auxiliary device 102 can include a microcontroller, where the microcontroller includes the processor 106 and the memory 108 (e.g., an integrated circuit can include the processor 106 and the memory 108). According to another example, the auxiliary device 102 can include a plurality of microcontrollers, where the plurality of microcontrollers includes the processor 106 and the memory 108. Following this example, the processor 106 can include a plurality of processor cores and the memory 108 can include a plurality of memories; thus, a first microcontroller can include a first processor core (from the plurality of processor cores) and a first memory (from the plurality of memories), etc. However, it is to be appreciated that claimed subject matter is not limited to the auxiliary device 102 including microcontroller(s). In accordance with other examples, the auxiliary device 102 can include a separate microprocessor and memory (e.g., the processor 106 can be or include a microprocessor or a plurality of microprocessors).

Further, the mobile computing device 104 includes a processor 112 and a memory 114. The processor 112 is configured to execute instructions loaded into the memory 114 (e.g., one or more components loaded into the memory 114 are executable by the processor 112). According to various examples, the mobile computing device 104 can be a mobile telephone (e.g., a smartphone), a laptop computing device, a tablet computing device, a wearable computing device, a handheld computing device, a portable gaming device, a personal digital assistant, or the like.

The memory 108 of the auxiliary device 102 includes an interface component 116 that detects a user input at the auxiliary device 102. For instance, the interface component 116 can detect the user input via one or more of the sensors 110. An operation executed by the mobile computing device 104 can be performed responsive to the user input. Moreover, an identity of the operation can be a function of a context of the mobile computing device 104 and the user input. Pursuant to various examples, the identity of the operation can further be a function of a context of the auxiliary device 102.

The memory 108 of the auxiliary device 102 also includes a transceiver component 118 that transmits data indicative of the user input from the auxiliary device 102 to the mobile computing device 104. The transceiver component 118 can send the data indicative of the user input responsive to detection of the user input by the interface component 116.

Moreover, the memory 114 of the mobile computing device 104 includes a transceiver component 120. The transceiver component 120 of the mobile computing device 104 receives the data indicative of the detection of the user input from the auxiliary device 102. Moreover, it is contemplated that other data (e.g., contextual data, etc.) can be transmitted by the transceiver component 118 of the auxiliary device 102 and received by the transceiver component 120 of the mobile computing device 104. Further, data can be transmitted by the transceiver component 120 of the mobile computing device 104 and received by the transceiver component 118 of the auxiliary device 102 (e.g., data that can be output by the auxiliary device 102, etc.).

As noted above, the auxiliary device 102 and the mobile computing device 104 are wirelessly coupled. Accordingly, the transceiver component 118 of the auxiliary device 102 and the transceiver component 120 of the mobile computing device 104 can exchange data using one or more wireless technologies. Examples of wireless technologies that can be employed by the transceiver component 118 and the transceiver component 120 for sending and receiving data include Bluetooth, near field communication (NFC), Wi-Fi (based on IEEE 802.11 standards), and so forth.

The memory 114 of the mobile computing device 104 further includes a context identification component 122 that obtains contextual data indicative of a context of the mobile computing device 104. The context identification component 122 can detect the context of the mobile computing device 104 and generate the contextual data based upon the detected context. The contextual data identified by the context identification component 122, according to various examples, can specify a position of the mobile computing device 104 (e.g., a geographic position at which the mobile computing device 104 is located), an orientation of the mobile computing device 104, a velocity at which the mobile computing device 104 is moving, a direction of movement of the mobile computing device 104, a device with which the mobile computing device 104 is mechanically attached (e.g., a dock with which the mobile computing device 104 is mechanically attached), a device with which the mobile computing device 104 is communicatively coupled (e.g., a device wirelessly paired with the mobile computing device 104, a device that receives data output from the mobile computing device 104, etc.), an application being executed by the processor 112 of the mobile computing device 104, a state of the mobile computing device 104, a combination thereof, and so forth.

Moreover, the memory 114 of the mobile computing device 104 includes a personal assistant component 124. The personal assistant component 124 can perform the operation responsive to receipt of the data indicative of the user input. As noted above, the identity of the operation can be a function of the context of the mobile computing device 104 (e.g., determined by the context identification component 122) and the user input. For instance, the personal assistant component 124 can determine the identity of the operation to be performed based upon the context of the mobile computing device 104 and the user input.

According to various examples, the identity of the operation performed by the personal assistant component 124 executed by the mobile computing device 104 responsive to receipt of the data indicative of the user input can further be a function of a context of the auxiliary device 102. Examples of the context of the auxiliary device 102 can include whether the auxiliary device 102 is mechanically attached to a disparate device and, if mechanically attached, a type of the disparate device. Additionally or alternatively, the context of the auxiliary device 102 can include a position of the auxiliary device 102 (e.g., a geographic position at which the auxiliary device 102 is located), an orientation of the auxiliary device 102, a relative position and/or orientation of the auxiliary device 102 with respect to the mobile computing device 104, a velocity at which the auxiliary device 102 is moving, a direction of movement of the auxiliary device 102, a change in orientation of the auxiliary device 102 (e.g., changes in pitch, roll, and yaw), or the like. Moreover, the context of the auxiliary device 102 can include or be based on other user input(s) received by the auxiliary device 102 (e.g., user input(s) other than the user input that causes the performance of the operation by the mobile computing device 104).

Identities of potential operations performable by the personal assistant component 124 (e.g., performable responsive to respective user inputs) during a period of time can be tailored as a function of the context of the mobile computing device 104 and the context of the auxiliary device 102 during the time period. For example, during a first period of time, the mobile computing device 104 can execute a first operation responsive to a first user input (e.g., a detected touch of a first button of the auxiliary device 102 during the first period of time) and a second operation responsive to a second user input (e.g., a detected touch of a second button of the auxiliary device 102 during the first period of time). The identities of the first operation and the second operation can be a function of the context of the mobile computing device 104 and the context of the auxiliary device 102 during the first period of time. Further, during a second period of time, the mobile computing device 104 can execute a third operation responsive to the first user input (e.g., a detected touch of the first button of the auxiliary device 102 during the second period of time) and a fourth operation responsive to the second user input (e.g., a detected touch of the second button of the auxiliary device 102 during the second period of time). The identities of the third operation and the fourth operation can be a function of the context of the mobile computing device 104 and the context of the auxiliary device 102 during the second period of time.

In various scenarios, it is contemplated that a user may be unable to interact with his or her mobile computing device 104. Illustrations of such scenarios where the user is situationally impaired with respect to the mobile computing device 104 include the mobile computing device 104 being outside of a reach of the user or the user's attention being focused away from the mobile computing device 104. For example, the user may desire to play a song on the mobile computing device 104 when driving in an automobile. Conventionally, to play the song, the user would typically shift his or her attention away from driving the automobile to interact with the mobile computing device 104 (e.g., to select the song and initiate playback). According to another example, the user may desire to change a song being played by the mobile computing device 104, when the mobile computing device 104 is docked to a stereo. However, the user may be at a remote position relative to a position of the mobile computing device 104. Thus, the user would traditionally relocate to the position of the mobile computing device 104 to change the song being played. In contrast to the conventional approaches, the auxiliary device 102 enables the mobile computing device 104 to be remotely controlled. Moreover, the identity of the operation performed by the mobile computing device 104 responsive to the user input received via the auxiliary device 102 can be tailored based upon the situational impairment (e.g., which can be recognized based upon the context of the mobile computing device 104 and/or the context of the auxiliary device 102).

The auxiliary device 102 can be used to remotely control operations performed by the mobile computing device 104 (e.g., operations performed by the personal assistant component 124, other operations performed by the mobile computing device 104, etc.). Examples of operations performed by the mobile computing device 104 that can be controlled responsive to the user input detected by the interface component 116 can include playing media on the mobile computing device 104, performing searches (e.g., responsive to voice search queries), launching applications, and so forth. Additionally or alternatively, the auxiliary device 102 can be used to provide input to the personal assistant component 124 of the mobile computing device 104. For instance, speech input can be used to generate a search query, a detected touch can be used for confirmation (e.g., yes or no) or continuous input (e.g., volume up/down), and so forth.

Figure 2:
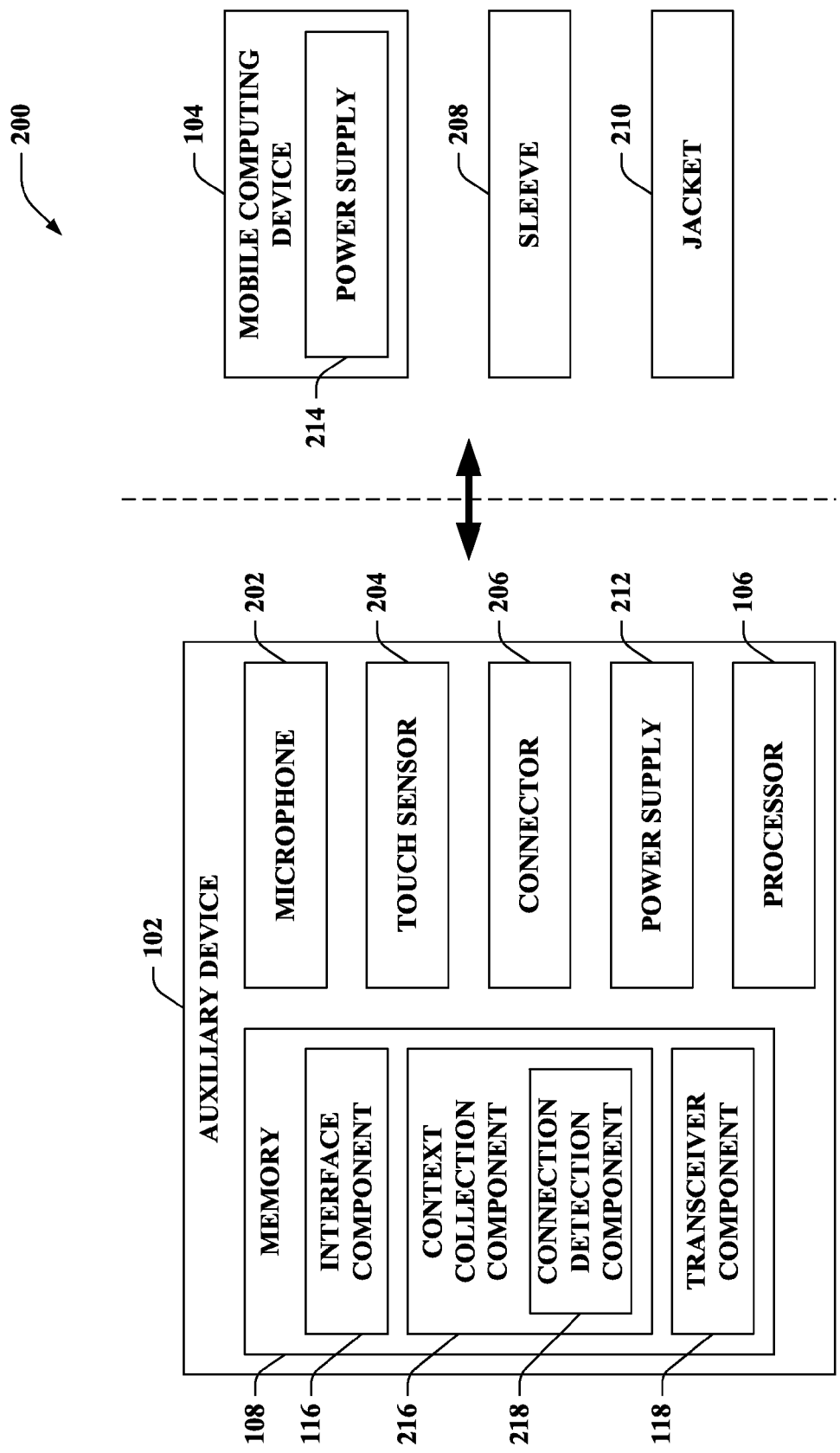
FIG. 2 illustrates a functional block diagram of an exemplary system that employs the auxiliary device to remotely control the mobile computing device.

Turning to FIG. 2, illustrated is a system 200 that employs the auxiliary device 102 to remotely control the mobile computing device 104. As depicted in the example of FIG. 2, the auxiliary device 102 includes a microphone 202 and a touch sensor 204 (e.g., the sensors 110 of FIG. 1 include the microphone 202 and the touch sensor 204). While the auxiliary device 102 is described as including one touch sensor 204, it is contemplated that the auxiliary device 102 can include substantially any number of additional touch sensors that can be substantially similar to the touch sensor 204.

As noted above, the interface component 116 can detect a user input at the auxiliary device 102, and an operation executed by the mobile computing device 104 can be performed responsive to the user input (e.g., the operation can be performed by the personal assistant component 124 of the mobile computing device 104, the operation can be a disparate operation performed by the mobile computing device 104). By way of illustration, the interface component 116 can detect a touch of the touch sensor 204. Further, the transceiver component 118, responsive to detection of the touch of the touch sensor 204, can transmit data indicative of the touch of the touch sensor 204 to the mobile computing device 104. Thus, the operation executed by the mobile computing device 104 can be performed responsive to the touch of the touch sensor 204. Moreover, an identity of the operation executed by the mobile computing device 104 responsive to the touch of the touch sensor 204 can be a function of the touch of the touch sensor 204 and the context of the mobile computing device 104.

Pursuant to another illustration, the interface component 116 can detect speech input at the auxiliary device 102, where the speech input is received by the microphone 202. Responsive to receipt of the speech input, the transceiver component 118 can transmit the speech input from the auxiliary device 102 to the mobile computing device 104. According to an example, the operation executed by the mobile computing device 104 can be performed responsive to the speech input received by the microphone 202. Pursuant to another example, the speech input can provide contextual data; thus, the operation executed by the mobile computing device 104 can be performed responsive to a differing user input (e.g., a touch of the touch sensor 204), while the identity of the operation can be a function of the speech input.

According to an example, the auxiliary device 102 can perform speech recognition on the speech input. By way of another example, the mobile computing device 104 can perform speech recognition on the speech input. Pursuant to another example, the speech input can be transmitted to a server computing system (e.g., from the auxiliary device 102, from the mobile computing device 104); the server computing system can perform speech recognition on the speech input and return recognized speech data (e.g., to the auxiliary device 102, to the mobile computing device 104). According to an illustration, the auxiliary device 102 can transmit the speech input to the server computing system, the server computing system can perform speech recognition on the speech input to generate recognized speech data, and the recognized speech data can be transmitted to the mobile computing device 104; yet, the claimed subject matter is not so limited.

Various touch sensor types are intended to fall within the scope of the hereto appended claims. For example, the touch sensor 204 can be a push-button; thus, a housing of the auxiliary device 102 can include the push-button (e.g., a mechanical switch mechanism). According to another example, the touch sensor 204 can be a differing mechanical switch mechanism other than a push-button (e.g., dial, lever, slider, etc.). Pursuant to another example, the housing of the auxiliary device 102 can include a touch sensitive surface (e.g., capacitive sensor(s) constructed from media such as copper, Indium tin oxide (ITO), etc.), and the touch sensitive surface can be or include the touch sensor 204. For instance, the touch sensitive surface can include a plurality of touch sensors (including the touch sensor 204); yet, the claimed subject matter is not so limited. In accordance with yet another example, the auxiliary device 102 can include a touchscreen; the touchscreen can display a virtual button (e.g., the virtual button displayed on the touchscreen can be the touch sensor 204). Moreover, it is contemplated that other touch sensor types are intended to fall within the scope of the hereto appended claims.

According to an illustration, the auxiliary device 102 can provide haptic feedback responsive to a touch of the touch sensor 204 detected by the interface component 116. For instance, if the touch sensor 204 is a touch sensitive surface or a portion thereof, the auxiliary device 102 can output haptic feedback responsive to detection of a touch of the touch sensitive surface (or the portion thereof).

Moreover, the auxiliary device 102 can include a connector 206. The connector 206 can removably attach the auxiliary device 102 to various disparate devices. Thus, the connector 206 can mechanical attach the auxiliary device 102 to a disparate device; thereafter, the auxiliary device 102 can be detached from the disparate device.

The auxiliary device 102 can be interchangeably attachable to a plurality of types of disparate devices. Examples of disparate device types with which the auxiliary device 102 can be interchangeably attachable include mobile computing devices, sleeves, jackets, a combination thereof, and so forth. For instance, the auxiliary device 102 can be removably attachable to the mobile computing device 104, a sleeve 208, a jacket 210, and so forth. Thus, the connector 206 can be removably attachable with a corresponding connector of the mobile computing device 104, a corresponding connector of the sleeve 208, a corresponding connector of the jacket 210, and so forth. Although not shown, it is contemplated that the auxiliary device 102 can be removably attachable to differing types of mobile computing devices, differing types of sleeves, differing types of jackets, and the like.

According to an illustration, the connector 206 can enable the auxiliary device 102 to mechanically attach to the mobile computing device 104. The auxiliary device 102 can thereafter be detached from the mobile computing device 104. By way of another illustration, the sleeve 208 can be mechanically attachable to the mobile computing device 104 (e.g., the sleeve 208 can form a cavity in which a housing of the mobile computing device 104 can be received). Following this illustration, the auxiliary device 102 can be mechanically attachable to and detachable from the sleeve 208 (e.g., the auxiliary device 102 can be removably attachable with an accessory of the mobile computing device 104). Pursuant to yet another example, the connector 206 can enable the auxiliary device 102 to mechanically attach to and detect from the jacket 210 (or a plurality of jackets). For instance, the auxiliary device 102 can concurrently be mechanically attached to a plurality of differing types of jackets; yet, the claimed subject matter is not so limited.

By way of example, substantially any type of connector 206 is intended to fall within the scope of the hereto appended claims. For example, the connector 206 can be or include a feature formed in a material of a housing of the auxiliary device 102. Following this example, the connector 206 can include grooves, protrusions, cavities, etc. formed in the material of the housing. According to another example, the connector 206 can be or include a magnet. However, substantially any other type of connector 206 is intended to fall within the scope of the hereto appended claims.

The auxiliary device 102 can mechanically attach to one or more types of jackets (e.g., the jacket 210) via the connector 206. The jackets can be designed for differing contexts. For example, the jackets can include one or more of the following: a clip jacket (e.g., attachable to a lapel of a garment, a neckline of a garment, a belt, a waistband of a garment, etc.), an automobile jacket (e.g., a base that is mechanically attachable to an automobile steering wheel), a wrist-worn strap (e.g., a health monitor or watch), a necklace, a lanyard, or the like.

The auxiliary device 102 further includes a power supply 212. According to an example, the power supply 212 of the auxiliary device 102 can be charged when the auxiliary device 102 is mechanically attached to the mobile computing device 104. For instance, a power supply 214 of the mobile computing device 104 can charge the power supply 212 of the auxiliary device 102 when mechanically attached (e.g., the power supply 214 can be part of a charging source that charges the power supply 212). By way of another example, the power supply 212 of the auxiliary device 102 can be charged when the auxiliary device 102 is mechanically attached to the sleeve 208, where the sleeve 208 is mechanically attached to the mobile computing device 104; again, it is contemplated that the power supply 214 of the mobile computing device 104 can charge the power supply 212 of the auxiliary device 102. Pursuant to a further example, the auxiliary device 102 can charge the power supply 214 of the mobile computing device 104 when mechanically attached (e.g., the power supply 212 can be part of a charging source that charges the power supply 214, the auxiliary device 102 can be a portable charger for the mobile computing device 104, etc). In accordance with the foregoing examples, it is to be appreciated that the power supply 212 can be concurrently charged with the power supply 214. Moreover, the mobile computing device 104 or the sleeve 208 can support Qi charging of the power supply 212. According to other examples, the jacket 210 may charge the power supply 212 of the auxiliary device 102 (e.g., the jacket 210 can include or be connected to a power supply that can charge the power supply 212); yet, the claimed subject matter is not so limited.

The memory 108 of the auxiliary device 102 can further include a context collection component 216 that obtains contextual data indicative of a context of the auxiliary device 102. The context collection component 216 can detect the context of the auxiliary device 102. Moreover, the context collection component 216 can generate the contextual data indicative of the context of the auxiliary device 102. The transceiver component 118 can transmit the contextual data from the auxiliary device 102 to the mobile computing device 104. According to an example, the contextual data can specify that the auxiliary device 102 is mechanically attached to a disparate device and a type of the disparate device. By way of another example, the contextual data can specify a position of the auxiliary device 102. Pursuant to a further example, the contextual data can include speech input received by the microphone 202. Yet, it is contemplated that other types of contextual data are intended to fall within the scope of the hereto appended claims.

As described herein, the mobile computing device 104 can perform an operation responsive to user input detected by the interface component 116 of the auxiliary device 102. An identity of the operation performed responsive to the user input executed by the mobile computing device 104 can be a function of the context of the auxiliary device 102 as well as the context of the mobile computing device 104 and the user input. While many examples set forth herein describe the context collection component 216 detecting the contextual data indicative of the context of the auxiliary device 102, it is contemplated that the mobile computing device 104 (e.g., the context identification component 122) can additionally or alternatively detect the contextual data indicative of the context of the auxiliary device 102 (or a portion of such contextual data).

According to an example, the context collection component 216 can include a connection detection component 218. The connection detection component 218 can detect whether the auxiliary device 102 is mechanically attached to a disparate device. Thus, the connection detection component 218 can detect whether the auxiliary device 102 is mechanically attached (via the connector 206) to the mobile computing device 104, the sleeve 208, the jacket 210, or substantially any other disparate device. The connection detection component 218 can also detect whether the auxiliary device 102 is detached from the disparate devices (e.g., not mechanically attached to any disparate device). If detected to be mechanically attached to a disparate device, the connection detection component 218 can further determine a type of the disparate device. The connection detection component 218, for instance, can identify the type of the disparate device using NFC, radio-frequency identification (RFID), and so forth.

Further, the connection detection component 218 can generate mechanical attachment data indicative of whether the auxiliary device 102 is mechanically attached to the disparate device and the type of the disparate device, if the auxiliary device is mechanically attached to the disparate device. The transceiver component 118 can further transmit the mechanical attachment data from the auxiliary device 102 to the mobile computing device 104. Thus, the identity of the operation performed responsive to the user input executed by the mobile computing device 104 can be a function of whether the auxiliary device 102 is mechanically attached to the disparate device and the type of the disparate device, if the auxiliary device 102 is mechanically attached to the disparate device.

In accordance with an illustration, the jacket 210 can be an automobile jacket. The automobile jacket can be mechanically attachable to an automobile steering wheel. Responsive to the auxiliary device 102 being mechanically attached to the automobile jacket, the connection detection component 218 can detect that the auxiliary device 102 is mechanically attached to the automobile jacket. Further, the connection detection component 218 can generate mechanical attachment data indicative of the auxiliary device 102 being mechanically attached to the automobile jacket. The transceiver component 118 can further transmit such mechanical attachment data to the mobile computing device 104. Thus, the identity of the operation performed responsive to the user input executed by the mobile computing device 104 can be a function of the auxiliary device 102 being mechanically attached to the automobile jacket.

As noted above, the auxiliary device 102 can be removably attachable to the mobile computing device 104. According to an example, the auxiliary device 102 can be mechanically attachable to the mobile computing device 104 in a stowed configuration and an extended configuration. When in the extended configuration, the auxiliary device 102 can be a kickstand (e.g., for the mobile computing device 104). Accordingly, when the auxiliary device 102 is mechanically attached to the mobile computing device 104, the connection detection component 218 can detect such mechanical attachment and generate corresponding mechanical attachment data (which can be transmitted to the mobile computing device 104). Pursuant to an example, the mechanical attachment data can further specify whether the auxiliary device 102 is in the stowed configuration or the extended configuration. Hence, the identity of the operation performed responsive to the user input executed by the mobile computing device 104 can be a function of the auxiliary device 102 being mechanically attached to the mobile computing device 104. The identity of the operation, for instance, can further be a function of whether the auxiliary device 102 is in the stowed configuration or the extended configuration; yet, the claimed subject matter is not so limited. It is also contemplated that the mobile computing device 104 can additionally or alternatively detect the mechanical attachment between the mobile computing device 104 and the auxiliary device 102 and generate the corresponding mechanical attachment data.

According to another illustration, the auxiliary device 102 can be removably attachable to the sleeve 208. Further, the sleeve 208 can be mechanically attachable to the mobile computing device 104. By way of example, the auxiliary device 102 can be mechanically attachable to the sleeve 208 in a stowed configuration and an extended configuration; similar to above, the auxiliary device 102 can be a kickstand when in the extended configuration. Moreover, similar to above, when the auxiliary device 102 is mechanically attached to the sleeve 208, the connection detection component 218 can detect such mechanical attachment and generate the corresponding mechanical attachment data. Further, the transceiver component 118 can transmit the mechanical attachment data to the mobile computing device 104. Again, the mechanical attachment data can further specify whether the auxiliary device 102 is in the stowed configuration or the extended configuration, for example. Thus, the identity of the operation performed responsive to the user input executed by the mobile computing device 104 can be a function of the mechanical attachment data. Moreover, is it to be appreciated that the mobile computing device 104 can additionally or alternatively detect the mechanical attachment between the sleeve 208 and the auxiliary device 102 and generate the corresponding attachment data.

Figure 3:
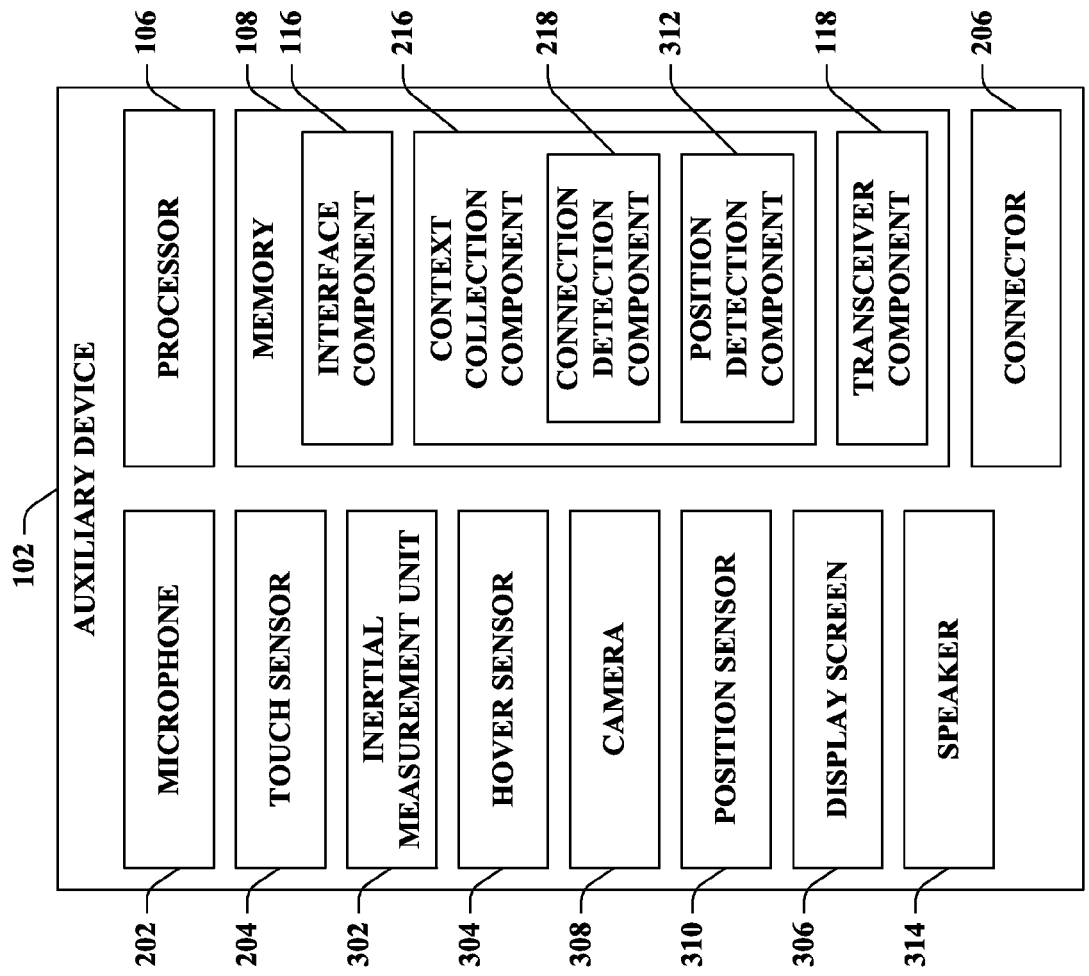
FIG. 3 illustrates a functional block diagram of an exemplary auxiliary device.

With reference to FIG. 3, illustrated is the auxiliary device 102 according to various examples. As shown in FIG. 3, the auxiliary device 102 includes the processor 106, the memory 108, the microphone 202, the touch sensor 204, and the connector 206. The memory 108 further includes the interface component 116 and the transceiver component 118. Moreover, the memory 108 can include the context collection component 216. However, according to other examples, the memory 108 need not include the context collection component 216.

In addition to the microphone 202 and the touch sensor 204, the auxiliary device 102 can optionally include one or more differing sensors. For instance, the interface component 116 can detect the user input based on output(s) of one or more of the differing sensors. Additionally or alternatively, the context collection component 216 can detect contextual data indicative of the context of the auxiliary device 102 based on output(s) of one or more of the differing sensors.

More particularly, the auxiliary device 102 can optionally include an inertial measurement unit 302. The inertial measurement unit 302 can include an accelerometer, a gyroscope, a combination thereof, and so forth. The inertial measurement unit 302 can output data indicative of an orientation of the auxiliary device 102 (e.g., pitch, roll, and yaw of the auxiliary device 102). Moreover, a change in the orientation of the auxiliary device 102 can be detected from the output of the inertial measurement unit 302; such change in the orientation can correspond to a physical gesture, for instance. According to an illustration, the auxiliary device 102 can be pointed towards a landmark (e.g., by a user). The auxiliary device 102 can be pointed towards the landmark as part of a search query (e.g., to obtain additional information pertaining to the landmark, etc.). Following this illustration, the interface component 116 can detect user input corresponding to the auxiliary device 102 being pointed towards the landmark based on output of the inertial measurement unit 302. The user input can be a physical gesture detected by the inertial measurement unit 302 of the auxiliary device 102.

Further, the auxiliary device 102 can optionally include a hover sensor 304. The hover sensor 304 can provide an output to the interface component 116 that enables the interface component 116 to detect a hover (e.g., of a finger, stylus, etc.) above a display screen 306 (e.g., the auxiliary device 102 can optionally include the display screen 306). Thus, the user input detected by the interface component 116 can be the hover above the display screen 306.

Moreover, the auxiliary device 102 can optionally include a camera 308. For instance, the user input detected by the interface component 116 can be based on output from the camera 308. Additionally or alternatively, the contextual data obtained by the context collection component 216 can be based on the output from the camera 308.

The auxiliary device 102 can optionally include a position sensor 310. The position sensor 310 can determine a position of the auxiliary device 102. The position sensor 310 can measure an absolute position of the auxiliary device 102 or a relative position of the auxiliary device 102 (e.g., relative to a position of the mobile computing device 104). For example, the position sensor 310 can be or include a Global Positioning System (GPS) receiver. According to another example, the position sensor 310 can detect the position of the auxiliary device 102 based upon a detected signal strength (e.g., of a signal transmitted by the mobile computing device 104, a node in a network, etc.). However, other types of the position sensor 310 are intended to fall within the scope of the hereto appended claims.

According to an example, the context collection component 216 can further include a position detection component 312 that detects a position of the auxiliary device 102. For instance, the position detection component 312 can identify the position of the auxiliary device 102 based on the output from the position sensor 310. The transceiver component 118 can transmit, from the auxiliary device 102 to the mobile computing device 104, data indicative of the position of the auxiliary device 102. Accordingly, the identity of the operation performed responsive to the user input executed by the mobile computing device 104 can further be a function of the position of the auxiliary device 102 (e.g., the absolute position, the position relative to a position of the mobile computing device 104, etc.). Moreover, is it to be appreciated that the mobile computing device 104 can additionally or alternatively detect the position of the auxiliary device 102.

As noted above, the auxiliary device 102 can optionally include the display screen 306. Further, the auxiliary device 102 can optionally include a speaker 314. The mobile computing device 104 can send output data to the auxiliary device 102, and the transceiver component 118 of the auxiliary device 102 can receive such output data from the mobile computing device 104. The output data, for instance, can include audio data, image data, video data, a combination thereof, and so forth. The interface component 116 can output the audio data via the speaker 314. Further, the interface component 116 can output the image data or the video data via the display screen 314. It is also contemplated that the auxiliary device 102 can include a jack; hence, the interface component 116 can output the audio data, the image data, the video data, a combination thereof, etc. via the jack.

Pursuant to an example, the display screen 306 can be a bi-stable screen; however, the claimed subject matter is not so limited. Further, dynamically altered icons for virtual buttons can be displayed on the display screen 306 (e.g., the display screen 306 can be a touchscreen that includes the touch sensor 204). Moreover, the display screen 306 can display confirmation of voice commands detected based upon speech input received by the microphone 202 (e.g., responsive to receipt of speech input to play song XYZ the display screen 306 can display "Playing Song XYZ", etc.).

Figure 4:
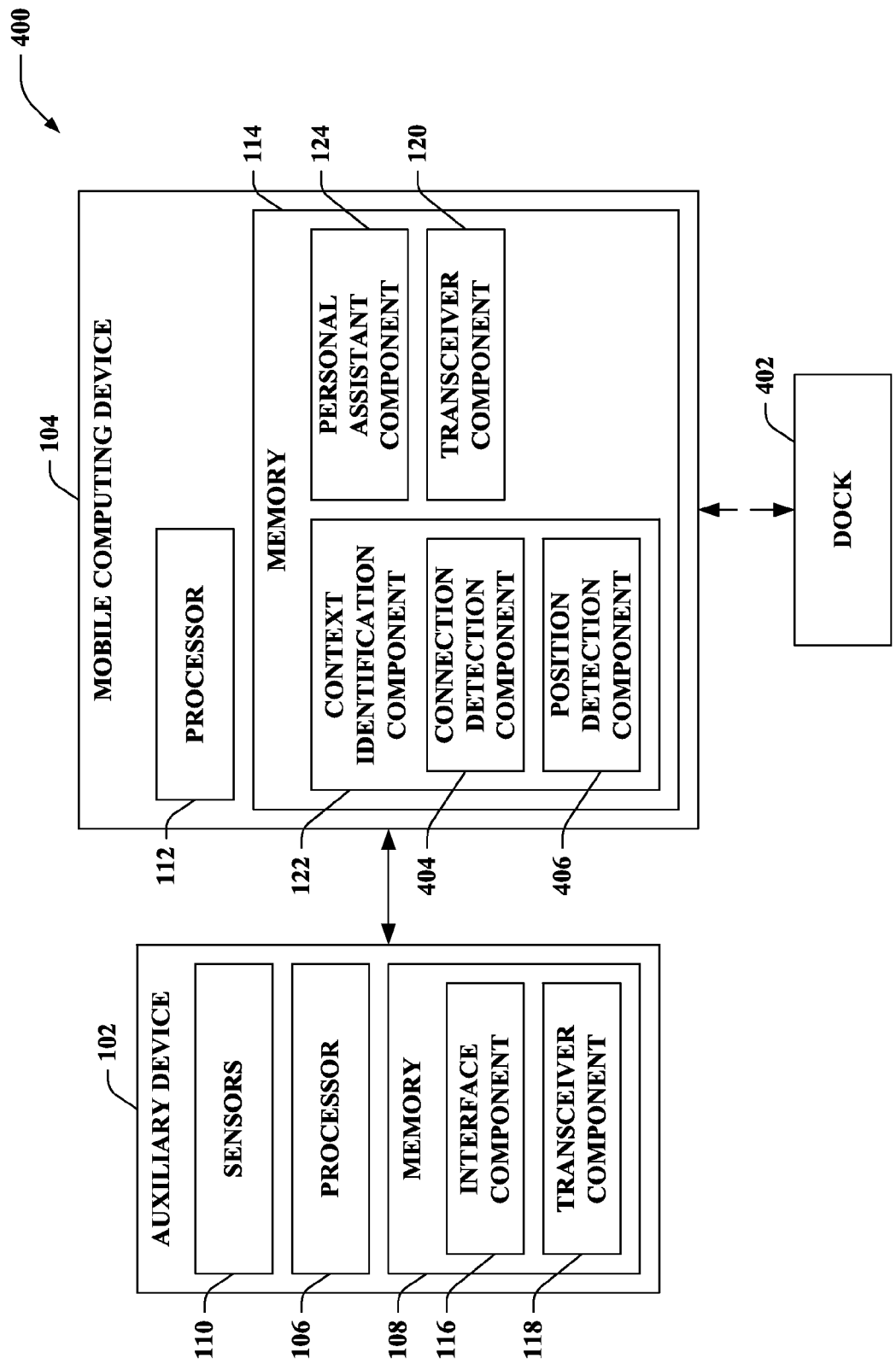
FIG. 4 illustrates a functional block diagram of an exemplary system that includes the auxiliary device and the mobile computing device, where the mobile computing device is removably attachable to a dock.

With reference to FIG. 4, illustrated is a system 400 that includes the auxiliary device 102 and the mobile computing device 104, where the mobile computing device 104 is removably attachable to a dock 402. The mobile computing device 104 can be removably attachable to various types of docks. For instance, the dock 402 can be a stereo dock, a bedside alarm clock dock, an automobile dock, a bicycle dock, or the like.

Again, as set forth above, the interface component 116 of the auxiliary device 102 can detect a user input at the auxiliary device 102, and an operation executed by the mobile computing device 104 (e.g., an operation executed by the personal assistant component 124, a disparate operation executed by the mobile computing device 104) can be performed responsive to the user input. An identity of the operation can be a function of a context of the mobile computing device 104 and the user input. According to an example, the context of the mobile computing device 104 can include whether the mobile computing device 104 is mechanically attached to any dock (e.g., the dock 402, other dock(s), etc.) and, if mechanically attached to a dock, a type of the dock.

Moreover, the context identification component 122 can detect the context of the mobile computing device 104. The context identification component 122 of the mobile computing device 104 can include a connection detection component 404. The connection detection component 404 can detect whether the mobile computing device 104 is mechanically attached to any dock (e.g., the dock 402, other dock(s), etc.). Moreover, if the mobile computing device 104 is detected to be mechanically attached to the dock 402, the connection detection component 404 can detect a type of the dock 402. The connection detection component 404 can further generate mechanical attachment data for the mobile computing device 104 that specifies whether the mobile computing device 104 is mechanically attached to a dock and, if mechanically attached to a dock (e.g., the dock 402), a type of the dock. Thus, the identity of the operation executed by the mobile computing device 104 can be a function of such mechanical attachment data for the mobile computing device 104.

According to various examples, it is contemplated that the connection detection component 404 can additionally or alternatively detect mechanical attachment of the auxiliary device 102 to the mobile computing device 104 (or mechanical attachment of the auxiliary device 102 to a sleeve, where the sleeve is mechanically attached to the mobile computing device 104). Following such examples, the connection detection component 404 can detect whether the auxiliary device 102 is in a stowed configuration or an extended configuration. Similar to above, the identity of the operation executed by the mobile computing device 104 can be a function of the mechanical attachment of the auxiliary device 102.

By way of illustration, the dock 402 can be an automobile dock. The mobile computing device 104 can be removably attachable to the automobile dock. When the mobile computing device 104 is mechanically attached to the automobile dock, the contextual data obtained by the connection detection component 404 can specify that the mobile computing device 104 is mechanically attached to the automobile dock. Mechanical attachment to the automobile dock can be indicative of an in-automobile context for the mobile computing device 104. Thus, the identity of the operation executed by the mobile computing device 104 responsive to the user input detected at the auxiliary device 102 can be a function of the in-automobile context for the mobile computing device 104. When in the in-automobile context (e.g., when mechanically attached to the automobile dock), the mobile computing device 104 can transmit data to a disparate device of the automobile (e.g., a car stereo, an in-car infotainment unit, etc.). Thus, the auxiliary device 102 can be used to remotely control the mobile computing device 104 as the mobile computing device 104 provides data to the disparate device of the automobile (when the mobile computing device 104 is mechanically attached to the automobile dock).

The context identification component 122 can further include a position detection component 406 that can detect a position of the mobile computing device 104. The identity of the operation performed responsive to the user input executed by the mobile computing device 104 can be a function of the position of the mobile computing device 104. Additionally or alternatively, the position detection component 406 can detect a position of the auxiliary device 102 (e.g., relative to the position of the mobile computing device 104, an absolute position of the auxiliary device 102). Thus, the identity of the operation can additionally or alternatively be a function of the position of the auxiliary device 102.

Figure 5:
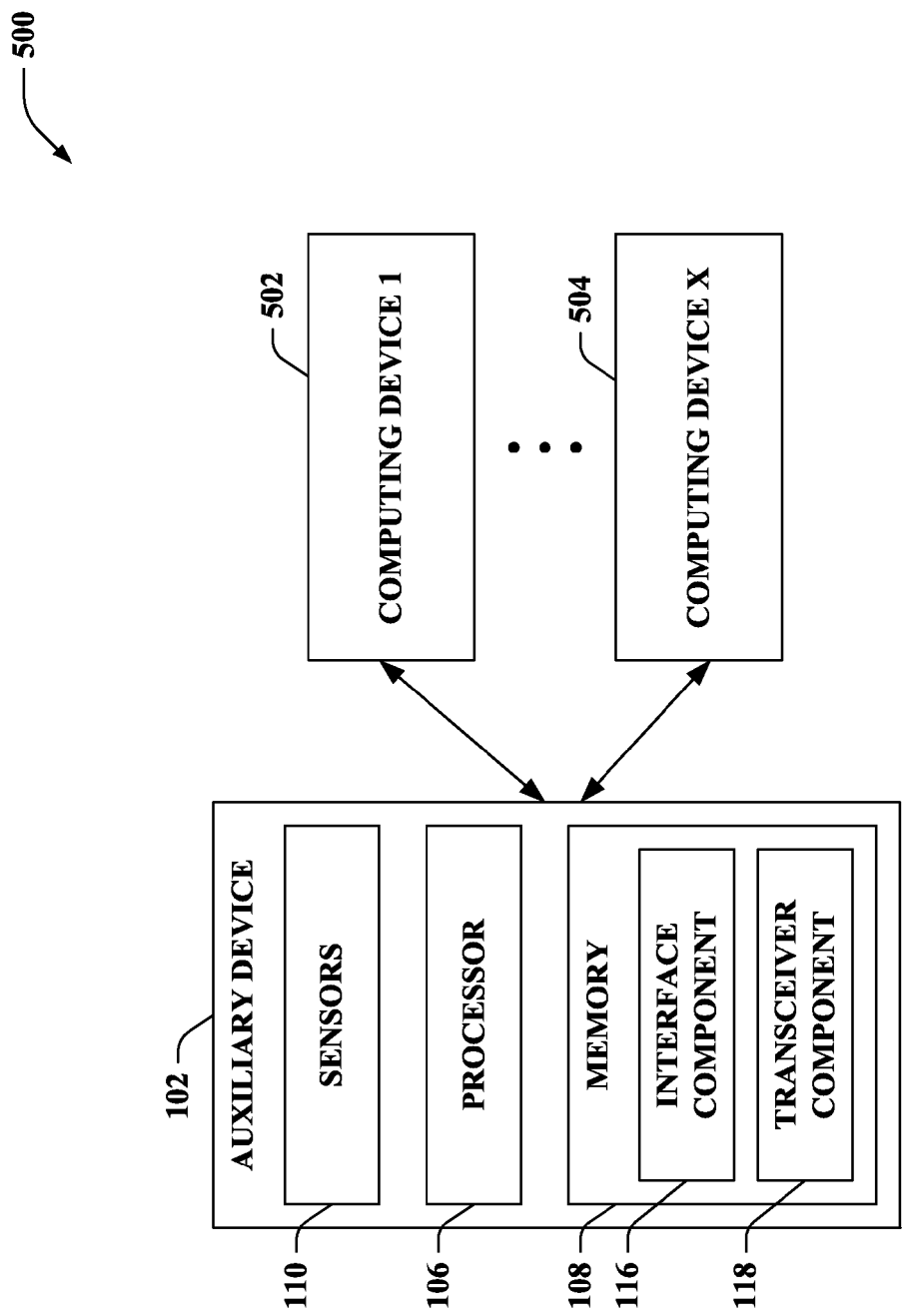
FIG. 5 illustrates a functional block diagram of an exemplary system that employs the auxiliary device with a plurality of computing devices.

Turning to FIG. 5, illustrated is a system 500 that employs the auxiliary device 102 with a plurality of computing devices. The system 500 includes a computing device 1 502, . . . , and a computing device X 504, where X can be substantially any integer greater than or equal to two (collectively referred to herein as computing devices 502-504). For instance, one of the computing devices 502-504 can be the mobile computing device 104.

The auxiliary device 102 can be wirelessly coupled with the computing devices 502-504 (e.g., the auxiliary device 102 can be concurrently coupled with the computing devices 502-504). Accordingly, the auxiliary device 102 can be used to remotely control operations executed by the computing devices 502-504. By way of illustration, the auxiliary device 102 can be pointed towards a particular one of the computing devices 502-504 to control an operation executed by that particular computing device; yet, the claimed subject matter is not so limited.

Figure 6:
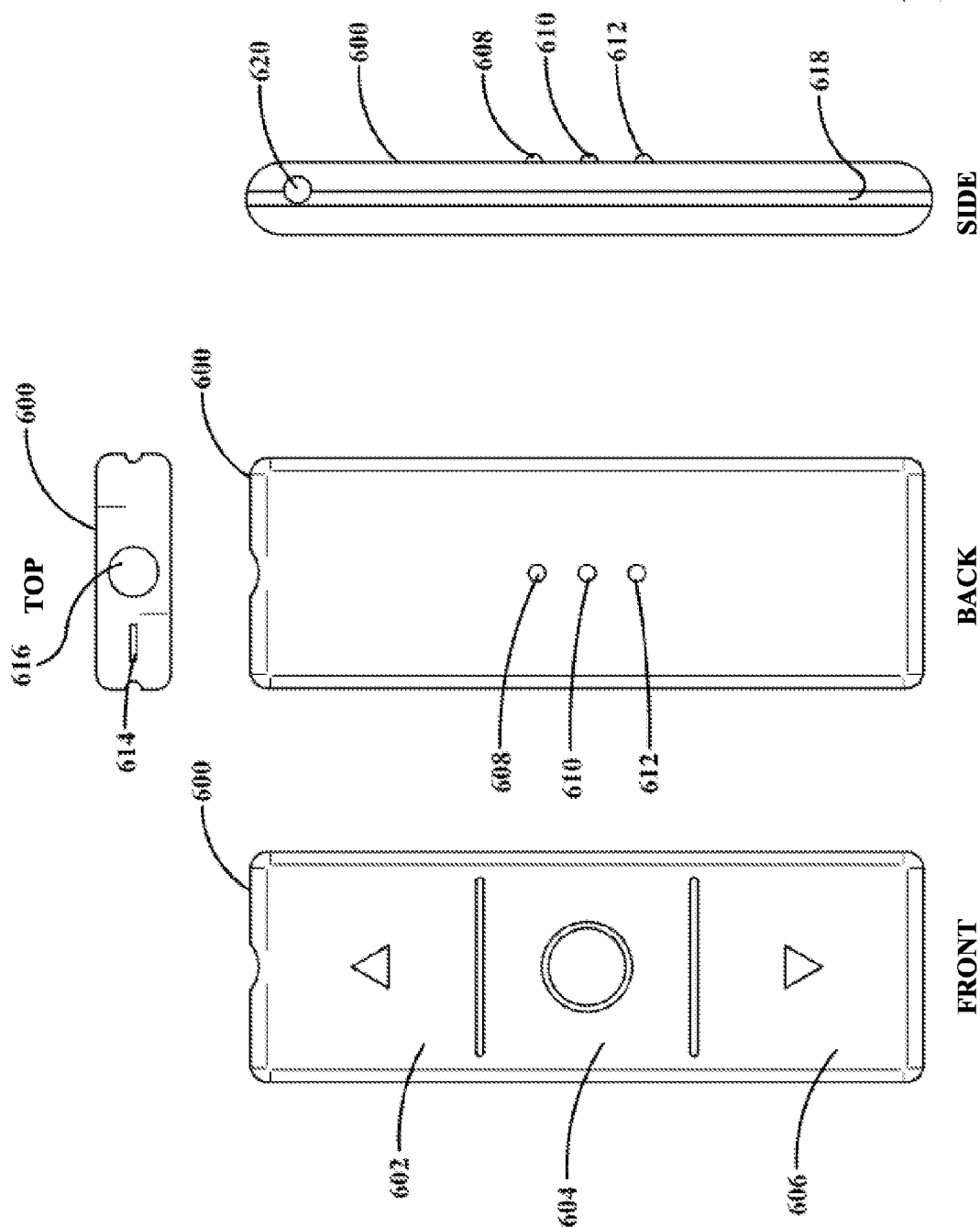
FIG. 6 illustrates various views of an exemplary auxiliary device.

Turning to FIG. 6, illustrated is an exemplary auxiliary device 600 (e.g., the auxiliary device 102). The auxiliary device 600 depicted in FIG. 6 (as well as in FIGS. 7-10 and 13-16) shows an exemplary implementation of the auxiliary device 102 described herein. Further, it is to be appreciated that other implementations of the auxiliary device 102 are intended to fall within the scope of the hereto appended claims.

FIG. 6 shows a front view, back view, side view, and top view of the auxiliary device 600. The auxiliary device 600 includes a housing. The housing, for example, can be made of a rubberized material; however, the claimed subject matter is not so limited. As shown in the front view, the auxiliary device 600 includes three buttons on a front surface of the housing, namely, a button 602, a button 604, and a button 606 (collectively referred to herein as buttons 602-606). Thus, touch sensors of the auxiliary device 600 can be or include the buttons 602-606.

Further, as shown in the back view and the side view, the auxiliary device 600 includes a plurality of charging pads on a back surface of the housing. For instance, in the example shown in FIG. 6, the auxiliary device 600 includes a charging pad 608, a charging pad 610, and a charging pad 612 (collectively referred to herein as charging pads 608-612). Moreover, as depicted in the top view, the auxiliary device 600 also includes a microphone 614 and a jack 616 on a top surface of the housing.

As described herein, the auxiliary device 600 can include a connector. In the example set forth in FIG. 6, the auxiliary device 600 can include a slot 618 along a side surface of the housing. Moreover, a cavity 620 can be formed in the side surface of the housing. The cavity 620 can be offset. Moreover, the cavity 620 can enable the auxiliary device 600 to be utilized as a kickstand. The other side surface of the housing of the auxiliary device 600 can similarly include a slot and a cavity. Various jackets can be mounted on the auxiliary device 600 by sliding protrusions of the jackets within the slots along the side surfaces of the housing. Moreover, the cavities can connect to the jackets, sleeves, or mobile computing devices.

Thus, the auxiliary device 600 includes the buttons 602-606 and the microphone 614. The auxiliary device 600 can transmit speech input and data indicative of touches of the buttons 602-606 to a mobile computing device wirelessly paired therewith (e.g., paired via a network protocol such as Bluetooth, etc.). Further, the auxiliary device 600 can transmit sensor data to enable a user to remotely control operations executed by the mobile computing device.

According to an example, the button 604 can be touched by a user of the auxiliary device 600 to invoke a personal assistant component (e.g., the personal assistant component 124) executed by the mobile computing device. Following this example, the microphone 614 can further capture speech input (e.g., asking for navigation directions, specifying a command, etc.). The speech input can be transmitted to the mobile computing device, and the personal assistant component of the mobile computing device can perform an operation responsive to the speech input (e.g., generate the direction, execute the command, etc.).

With reference to FIGS. 7-10, illustrated are various views of the auxiliary device 600 and a sleeve 700 (e.g., the sleeve 208). The auxiliary device 700 depicted in FIGS. 7-10 (as well as in FIG. 14) shows an exemplary implementation of the sleeve 208 described herein. Further, it is to be appreciated that other implementations of the sleeve 208 are intended to fall within the scope of the hereto appended claims.

Figure 10:
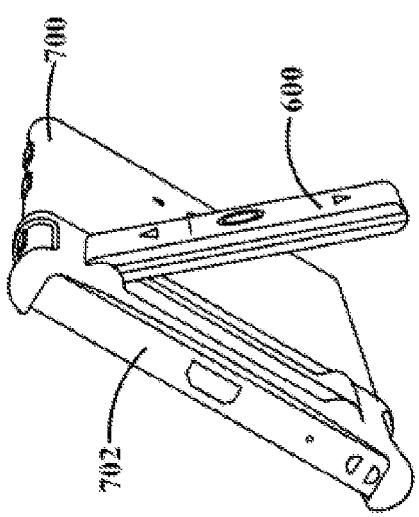

The sleeve 700 is mechanically attached to a mobile computing device 702 (e.g., the mobile computing device 104). The sleeve 700 can be a Qi charging sleeve. Accordingly, when mechanically attached in a stowed configuration (as shown in FIG. 10), the charging pads 608-612 of the auxiliary device 600 can respectively mate with charging locations 704, 706, and 708 (collectively referred to as charging locations 704-708) on the sleeve 700 or the mobile computing device 702. For example, the sleeve 700 can include the charging locations 704-708 that can respectively mate with the charging pads 608-612 of the auxiliary device 600. According to another example, the mobile computing device 702 can include the charging locations 704-708; following this example, cavities in the sleeve 700 corresponding to the charging locations 704-708 on the mobile computing device 702 can allow the charging pads 608-612 of the auxiliary device 600 to respectively mate with the charging locations 704-708 on the mobile computing device 702. Moreover, the sleeve 700 includes a connector 710 and a connector 712 (collectively referred to herein as connectors 710-712), which respectively mate with the cavities on the side surfaces of the housing of the auxiliary device 600.

Figure 7:
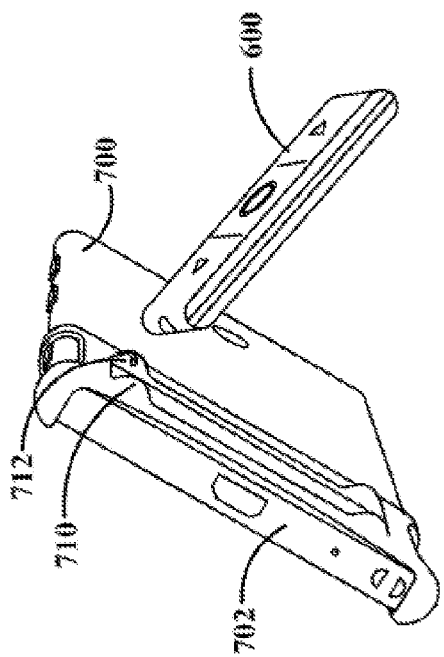
FIGS. 7-10 illustrate various views of the exemplary auxiliary device of FIG. 6 and an exemplary sleeve.
Figure 8:
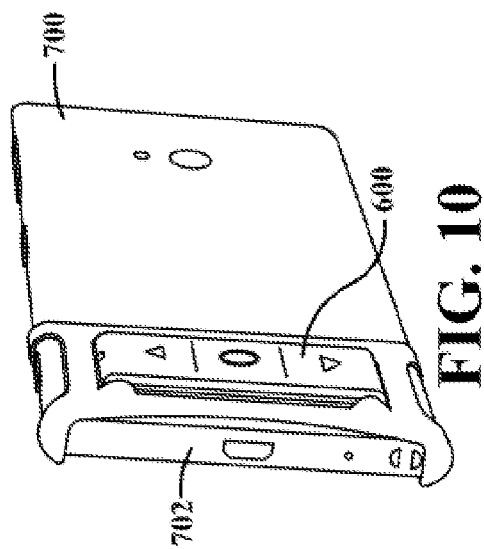
Figure 9:
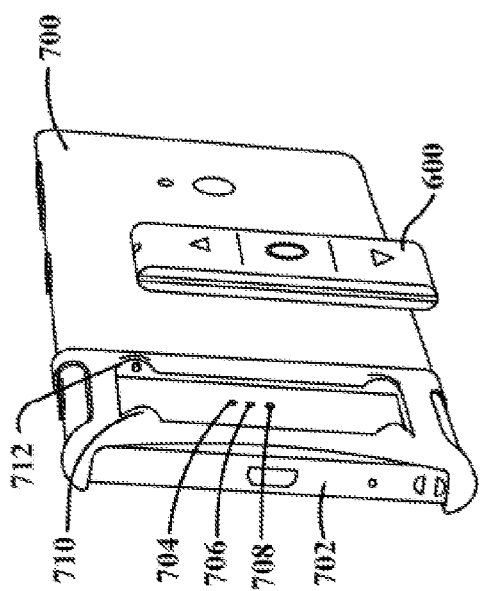

FIG. 7 shows the auxiliary device 600 being detached from the sleeve 700. As depicted in FIG. 8, the auxiliary device 600 can be oriented to mate the cavities of the auxiliary device 600 with the connectors 710-712 of the sleeve 700. FIGS. 9 and 10 show the auxiliary device 600 being mechanically attached to the sleeve 700.

As depicted in FIG. 9, the auxiliary device 600 is in an extended configuration, where the auxiliary device 600 is a kickstand for the sleeve 700 and the mobile computing device 702. FIG. 10 illustrates the auxiliary device 600 in a stowed configuration. In the stowed configuration, for instance, the auxiliary device 600 can be charged by the sleeve 700 via Qi charging. The auxiliary device 600 can be rotated about the cavities with respect to the sleeve 700 (and mobile computing device 702) to transition between the extended configuration and the stowed configuration.

Moreover, operations performed by the mobile computing device 702 responsive to touches of the buttons 602-606 of the auxiliary device 600 can be a function of whether the auxiliary device 600 is mechanically attached to the sleeve 700 or detached from the sleeve 700. For instance, the buttons 602-606 of the auxiliary device 600 can control camera related operations executed by the mobile computing device 702 when the auxiliary device 600 is mechanically attached to the sleeve 700, while disparate operations executed by the mobile computing device 702 can be controlled by the buttons 602-606 when the auxiliary device 600 is detached from the sleeve 700. According to an example, it is also contemplated that the operations can be a function of whether the auxiliary device 600 is in the stowed configuration (as shown in FIG. 10) or the extended configuration (as shown in FIG. 9); yet, the claimed subject matter is not so limited.

Figure 13:
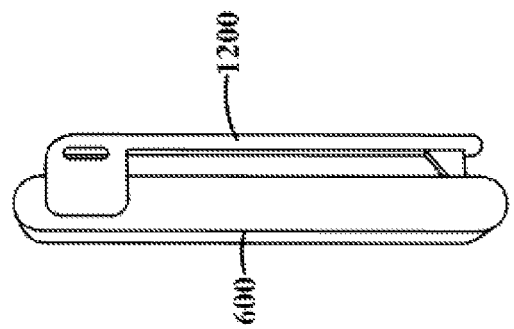
FIG. 13 illustrates the auxiliary device of FIG. 6 mechanically attached to the clip jacket of FIG. 12.
Figure 12:
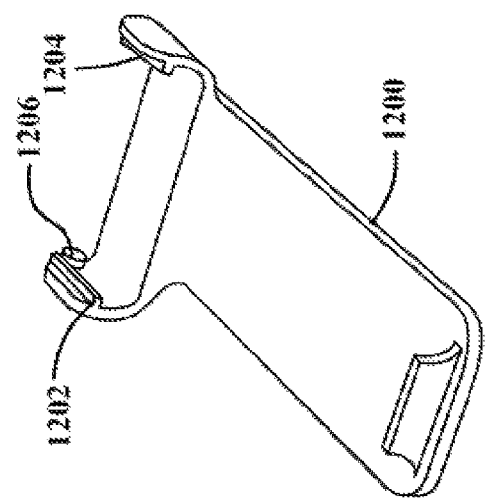
FIG. 12 illustrates an exemplary clip jacket.
Figure 11:
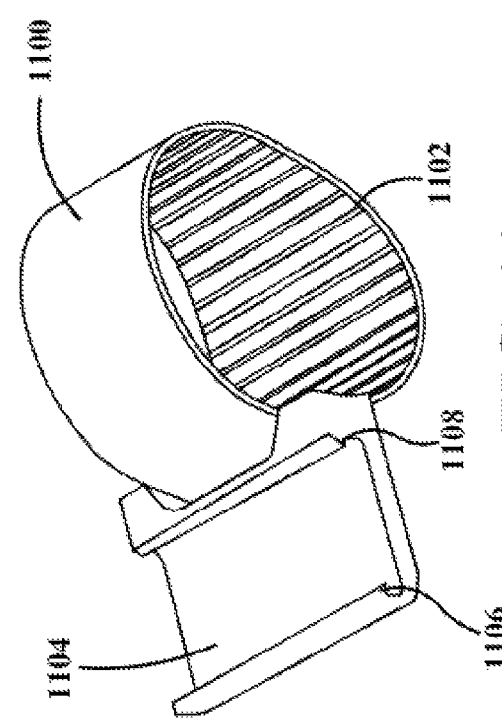
FIG. 11 illustrates an exemplary automobile jacket.

FIGS. 11-13 show exemplary implementations of the jacket 210 described herein. It is contemplated that other implementations of the jacket 210 are intended to fall within the scope of the hereto appended claims FIG. 11 depicts an exemplary automobile jacket 1100. The automobile jacket 1100 includes a steering wheel connector 1102 that is mechanically attachable to a steering wheel of an automobile. Moreover, the automobile jacket 1100 includes a device connector 1104. The auxiliary device 600 of FIG. 6 is removably attachable to the device connector 1104 of the automobile jacket 1100. Moreover, the auxiliary device 600 can be attached to or detached from the device connector 1104 while the steering wheel connector 1102 remains mechanically attached to the steering wheel of the automobile.

The device connector 1104 includes an elongated protrusion 1106 and an elongated protrusion 1108 (collectively referred to as elongated protrusions 1106-1108). To attach or detach the auxiliary device 600 and the device connector 1104, the elongated protrusion 1106-1108 of the device connector 1104 can be slid into or out of respective slots along the side surfaces of the housing of the auxiliary device 600.

FIG. 12 illustrates an exemplary clip jacket 1200. Similar to the automobile jacket 1100 of FIG. 11, the clip jacket 1200 includes an elongated protrusion 1202 and an elongated protrusion 1204 (collectively referred to as elongated protrusions 1202-1204). The elongated protrusions 1202-1204 can be slid into or out of respective slots along the side surfaces of the housing of the auxiliary device 600. Moreover, the clip jacket 1200 includes raised elements (e.g., a raised element 1206, etc.) that mate with the cavities on the side surfaces of the housing of the auxiliary device 600.

FIG. 13 shows the auxiliary device 600 mechanically attached to the clip jacket 1200. When attached to the clip jacket 1200, the auxiliary device 600 can be worn on a lapel of a garment, a neckline of a garment, a belt, a waistband of a garment, and so forth.

According to an example, the auxiliary device 600 can be mechanically attachable to the automobile jacket 1100 when the auxiliary device 600 is mechanically attached to the clip jacket 1200. Further following this example, the auxiliary device 600 can be mechanically attachable to the automobile jacket 1100 when the auxiliary device 600 is detached from the clip jacket 1200.

Figure 14:
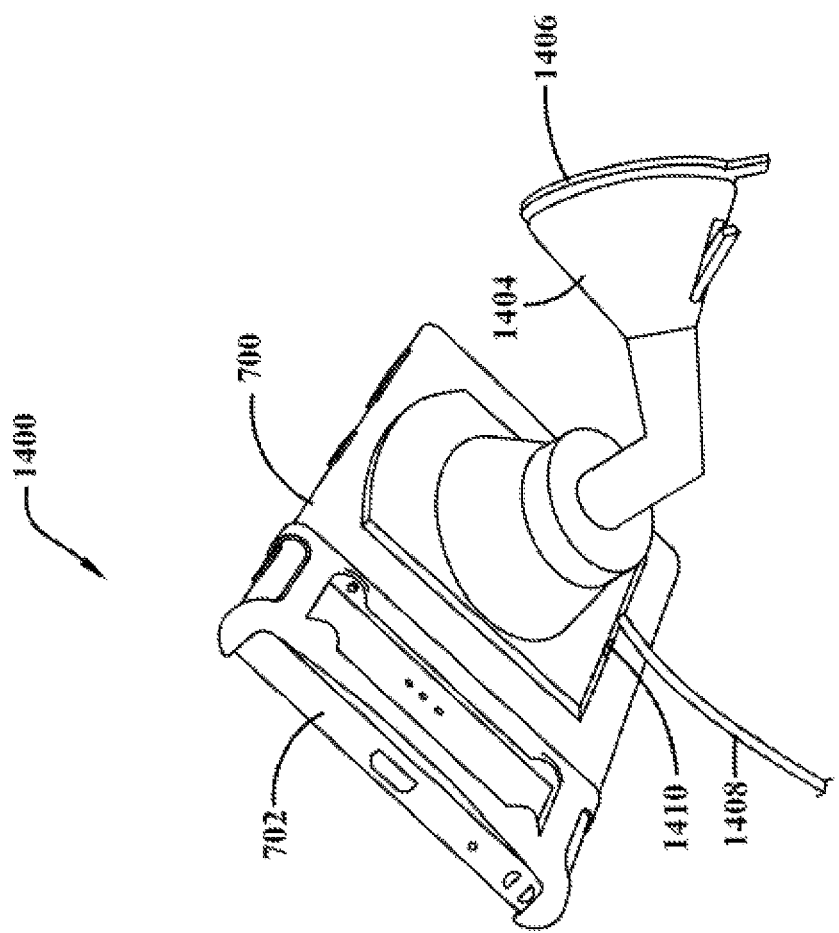
FIG. 14 illustrates an exemplary system where the auxiliary device of FIG. 6 remotely controls an exemplary mobile computing device in an automobile.
Figure 14:
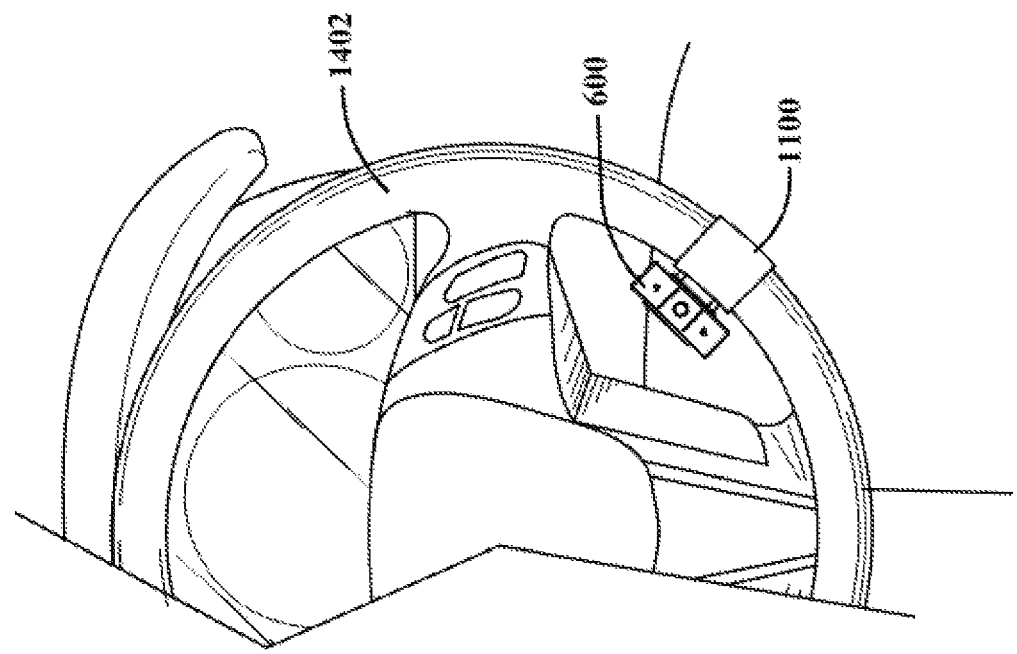
Figure 15:
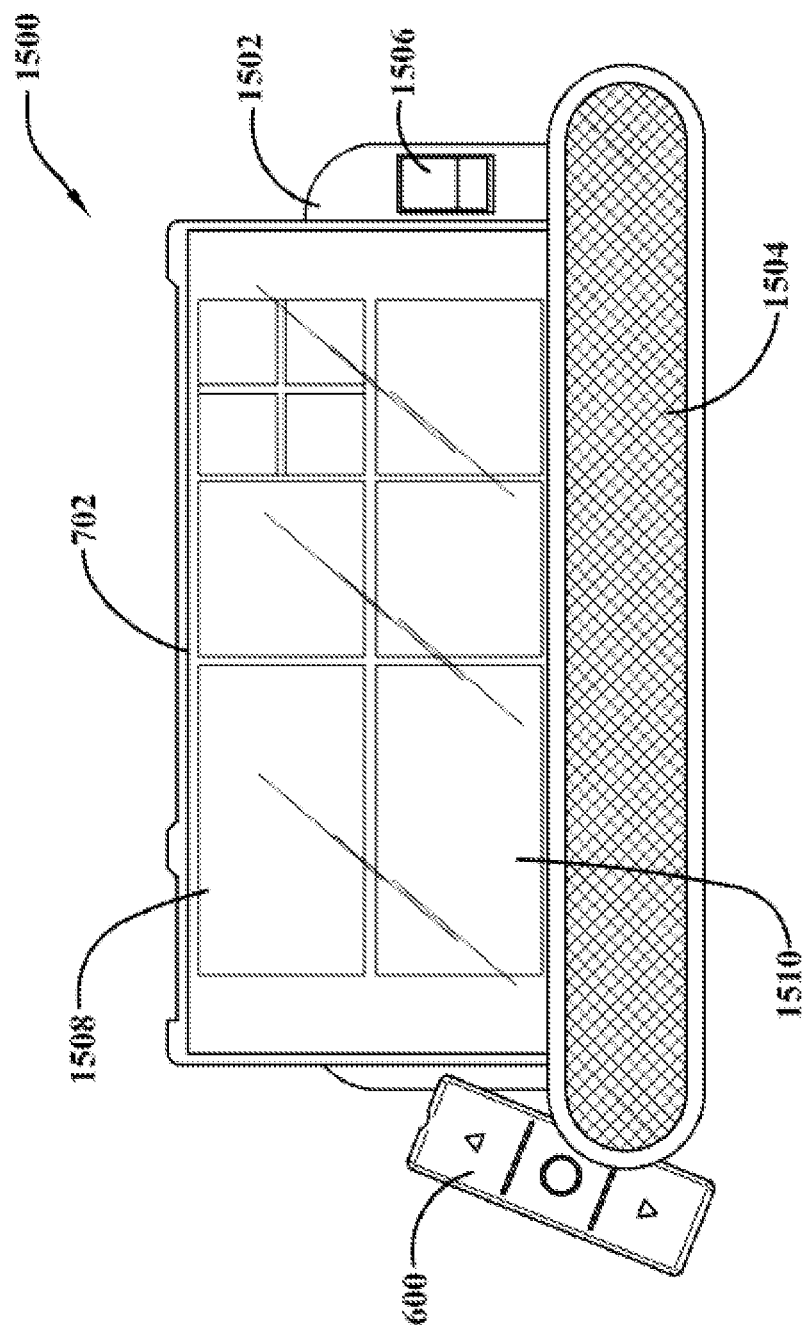
FIG. 15 illustrates an exemplary system that includes the mobile computing device, the auxiliary device of FIG. 6, and an exemplary bedside alarm clock dock.
Figure 16:
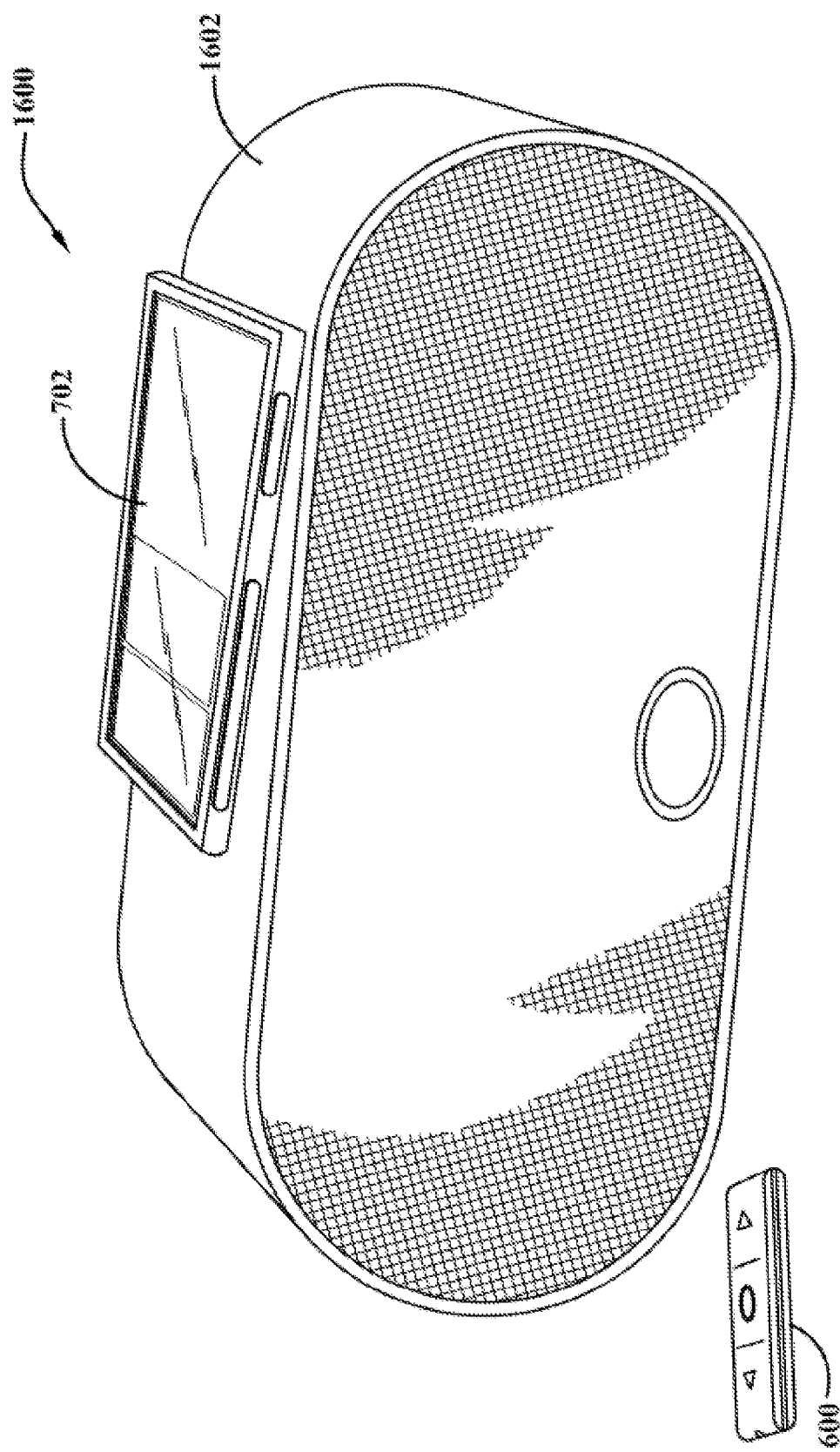
FIG. 16 illustrates an exemplary system that includes the auxiliary device of FIG. 6, the mobile computing device, and an exemplary speaker.

FIGS. 14-16 depict exemplary implementations of the dock 402 described herein. It is to be appreciated that other implementations of the dock 402 are intended to fall within the scope of the hereto appended claims Turning to FIG. 14, illustrated is an exemplary system 1400 where the auxiliary device 600 remotely controls the mobile computing device 702 in an automobile. The system 1400 includes the automobile jacket 1100, which is mechanically attached to a steering wheel 1402. Moreover, the system 1400 includes an automobile dock 1404. The automobile dock 1404 includes a suction cup 1406 that can attach to a dashboard or a window of the automobile. Moreover, the system 1400 includes the sleeve 700. The sleeve 700 is mechanically attached to the mobile computing device 702.

As depicted in FIG. 14, the sleeve 700 is mechanically attached to the automobile dock 1404, and the auxiliary device 600 is mechanically attached to the automobile jacket 1100. For example, the automobile dock 1404 can include a magnetic clasp (and the sleeve 700 can include corresponding magnets). Thus, the mobile computing device 702 (e.g., the sleeve 700) can be removably attachable to the automobile dock 1404 via the magnetic clasp. For instance, the sleeve 700 can magnetically snap to the magnetic clasp of the automobile dock 1404. However, it is to be appreciated that other support members of the automobile dock 1404 can additionally or alternatively mechanically attach to the sleeve 700.

When mechanically attached to the automobile dock 1404, a camera of the mobile computing device 702 can be available (e.g., for road sign analysis). Moreover, the automobile dock 1404 can include a power supply line 1408 and an audio output jack 1410. The power supply line 1408 can connect to a power jack of the automobile. The automobile dock 1404 can also include a wireless charging source; the wireless charging source can charge the mobile computing device 702 when mechanically attached. By way of example, the wireless charging source can support Qi charging of the mobile computing device 702 when mechanically attached. Moreover, the audio output jack 1410 can enable the audio output from the mobile computing device 702 to be provided to an in-car infotainment unit of the automobile, a car stereo, or the like (e.g., via an auxiliary wire to an auxiliary input, a tape deck, etc.).

Pursuant to an illustration, upon entering an automobile (in which the automobile dock 1404 was previously installed), the mobile computing device 702 can be mechanically attached to the automobile dock 1404 (e.g., via the magnetic clasp and/or other support members of the automobile dock 1404). Following this illustration, without connecting additional wires, etc., the mobile computing device 702 can send audio output to the in-car infotainment unit, car stereo, etc., while also being charged by the automobile dock 1404.

While driving, the buttons of the auxiliary device 600 can be used to perform various operations on the mobile computing device 702. For instance, a button (e.g., the button 604) of the auxiliary device 600 can be used to invoke a personal assistant component (e.g., the personal assistant component 124) executed by the mobile computing device 702. Moreover, the local microphone of the auxiliary device 600 (e.g., the microphone 614) can receive speech input, which can be provided to the mobile computing device 702 to perform various operations as described herein.

With reference to FIG. 15, illustrated is an exemplary system 1500 that includes the mobile computing device 702, the auxiliary device 600, and a bedside alarm clock dock 1502. The bedside alarm clock dock 1502 can include a speaker 1504. Moreover, the mobile computing device 702 can mechanically attach to the bedside alarm clock dock 1502 (e.g., the mobile computing device 702 can be received in a cradle of the bedside alarm clock dock 1502). The auxiliary device 600 can be utilized to control the mobile computing device 702 when the mobile computing device 702 is mechanically attached to the bedside alarm clock dock 1502. Moreover, the auxiliary device 600 can mechanically attach to the bedside alarm clock dock 1502 to charge a power supply of the auxiliary device 600.

Moreover, the bedside alarm clock dock 1502 can include a pico projector 1506. The pico projector 1506 can project messages, social media streams, and the like fed from the mobile computing device 702. The pico projector 1506 can project images on a wall, a ceiling, or the like. The auxiliary device 600 can control the pico projector 1506. According to an example, based upon being mechanically attached to the bedside alarm clock dock 1502, the mobile computing device 702 can display an alarm clock 1508, news 1510, and the like on a display screen of the mobile computing device 702.

The following provides an exemplary interaction using the auxiliary device 600 with the mobile computing device 702 docked in the bedside alarm clock dock 1502; it is to be appreciated, however, that the claimed subject matter is not so limited. The auxiliary device 600 can receive speech input while the auxiliary device 600 is located near the mobile computing device 702 (and the bedside alarm clock dock 1502); the speech input can include "What are my appointments today?" The speech input can be transmitted to the mobile computing device 702. Moreover, the relative position of the auxiliary device 600 can be identified (e.g., based upon contextual data received from the auxiliary device 600, the mobile computing device 702 can detect the relative position of the auxiliary device 600, etc.). Responsive to the speech input and the relative position of the auxiliary device 600, the mobile computing device 702 (e.g., a personal assistant component executed by the mobile computing device 702) can cause the pico projector 1506 to project today's appointments. Thereafter, the auxiliary device 600 can be moved away from the mobile computing device 702 (e.g., into a different room). Moreover, the auxiliary device 600 can receive speech input that includes "What are my emails?" Again, the relative position of the auxiliary device 600 can be identified. Responsive to this speech input and the relative position of the auxiliary device 600 that is farther from the mobile computing device 702, the mobile computing device 702 (e.g., the personal assistant component) can cause audio output that reads text of received emails to be provided via the speaker 1504. Further, the volume of the audio output can vary as a function of the relative position of the auxiliary device 600 as the auxiliary device 600 is repositioned relative to the position of the mobile computing device 702.

Turning to FIG. 16, illustrated is an exemplary system 1600 that includes the auxiliary device 600, the mobile computing device 702, and a speaker 1602. The auxiliary device 600 can be utilized to control operations executed by the mobile computing device 702. Moreover, the mobile computing device 702 can provide audio output to the speaker 1602. Thus, the auxiliary device 600 can remotely control audio being output via the speaker 1602.

Pursuant to an illustration, the mobile computing device 702 can be docked with the speaker 1602. The auxiliary device 600 can be carried by a user, and can be employed to remotely control the mobile computing device 702. For instance, when it is desired to change a song being played by the mobile computing device 702, a button (e.g., the button 604) of the auxiliary device 600 can be touched to invoke a personal assistant component (e.g., the personal assistant component 124) executed by the mobile computing device 702. Moreover, speech input that specifies a next song to play can be received via a microphone (e.g., the microphone 614) of the auxiliary device 600. Responsive to the speech input, the personal assistant component can initiate playing the next song specified by the speech input.

Figure 17:
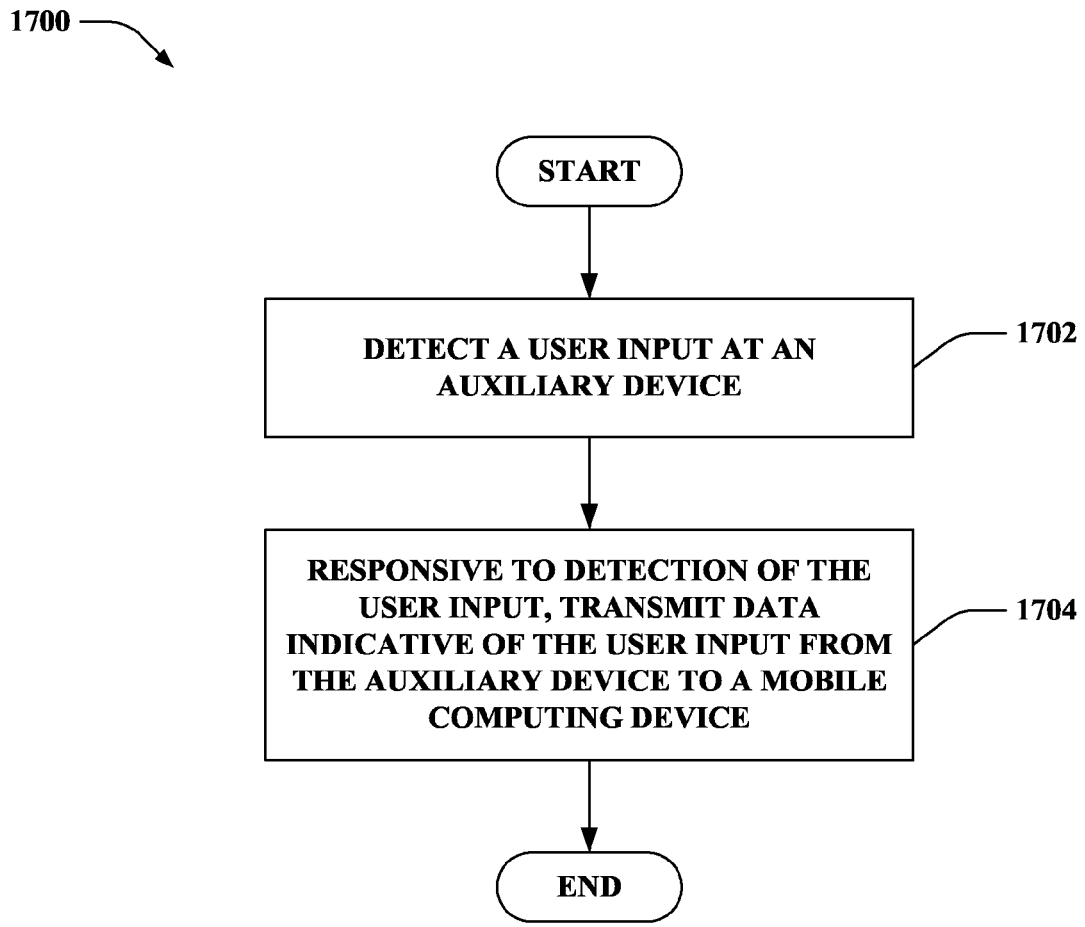
FIG. 17 is a flow diagram that illustrates an exemplary methodology of operating an auxiliary device.
Figure 18:
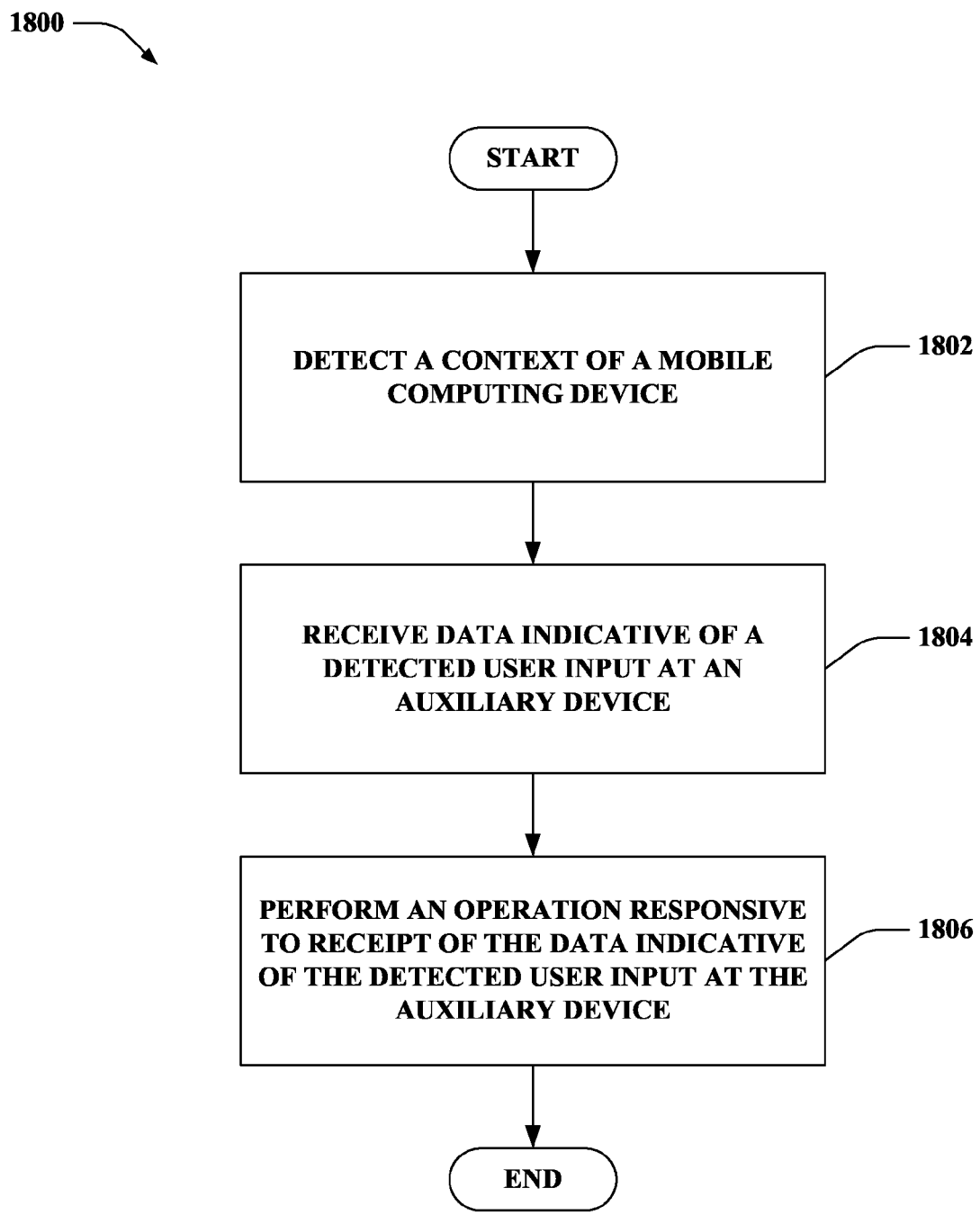
FIG. 18 is a flow diagram that illustrates an exemplary methodology of operating a mobile computing device.

FIGS. 17-18 illustrate exemplary methodologies relating to remotely controlling a mobile computing device using an auxiliary device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 17 illustrates a methodology 1700 of operating an auxiliary device. The auxiliary device can be wirelessly coupled with a mobile computing device. At 1702, a user input can be detected at the auxiliary device. An operation of a personal assistant component executed by the mobile computing device can be performed responsive to the user input. Moreover, an identity of the operation can be a function of a context of the mobile computing device and the user input. At 1704, responsive to detection of the user input, data indicative of the user input can be transmitted from the auxiliary device to the mobile computing device.

Turning to FIG. 18, illustrated is a methodology 1800 of operating a mobile computing device. The mobile computing device can be wirelessly coupled with an auxiliary device. At 1802, a context of the mobile computing device can be detected. At 1804, data indicative of a detected user input at the auxiliary device can be received. The data, for instance, can be received from the auxiliary device. At 1806, an operation can be performed by the mobile computing device responsive to receipt of the data indicative of the detected user input at the auxiliary device. An identity of the operation can be a function of the context of the mobile computing device and the user input.

Figure 19:
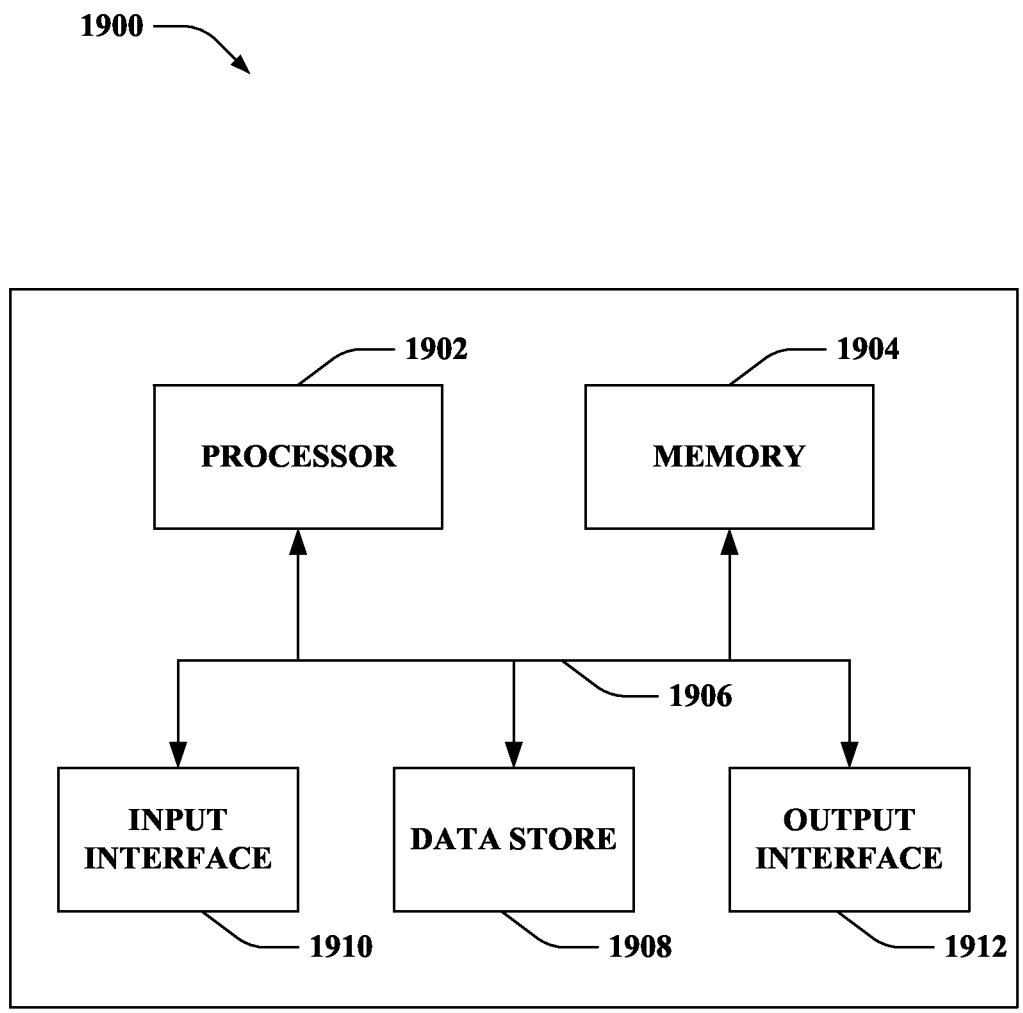
FIG. 19 illustrates an exemplary computing device.

Referring now to FIG. 19, a high-level illustration of an exemplary computing device 1900 that can be used in accordance with the systems and methodologies disclosed herein is illustrated. For instance, the computing device 1900 may be the auxiliary device 102. According to another example, the computing device 1900 can be the mobile computing device 104. Pursuant to another example, the computing device 1900 can be one of the computing devices 502-504, a dock, or the like. The computing device 1900 includes at least one processor 1902 that executes instructions that are stored in a memory 1904. The instructions may be, for instance, instructions for implementing functionality described as being carried out by one or more components discussed above or instructions for implementing one or more of the methods described above. The processor 1902 may access the memory 1904 by way of a system bus 1906. In addition to storing executable instructions, the memory 1904 may also store user inputs, contextual data, and so forth.

The computing device 1900 additionally includes a data store 1908 that is accessible by the processor 1902 by way of the system bus 1906. The data store 1908 may include executable instructions, user inputs, contextual data, etc. The computing device 1900 also includes an input interface 1910 that allows external devices to communicate with the computing device 1900. For instance, the input interface 1910 may be used to receive instructions from an external computer device, from a user, etc. The computing device 1900 also includes an output interface 1912 that interfaces the computing device 1900 with one or more external devices. For example, the computing device 1900 may display text, images, etc. by way of the output interface 1912.

It is contemplated that the external devices that communicate with the computing device 1900 via the input interface 1910 and the output interface 1912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1900 may be a distributed system. Thus, for instance, several devices may be in communication by way of a network connection and may collectively perform tasks described as being performed by the computing device 1900.

Various examples are now set forth.

Example 1

A method of operating an auxiliary device, the auxiliary device being wirelessly coupled with a mobile computing device, the method comprising: detecting a user input at the auxiliary device, an operation of a personal assistant component executed by the mobile computing device being performed responsive to the user input, an identity of the operation being a function of a context of the mobile computing device and the user input; and responsive to detection of the user input, transmitting data indicative of the user input from the auxiliary device to the mobile computing device.

Example 2

The method according to Example 1, further comprising: obtaining contextual data indicative of a context of the auxiliary device, the identity of the operation further being a function of the context of the auxiliary device; and transmitting the contextual data from the auxiliary device to the mobile computing device.

Example 3

The method according to Example 2, the contextual data specifies that the auxiliary device is mechanically attached to a disparate device and a type of the disparate device.

Example 4

The method according to any of Examples 2-3, the contextual data specifies at least one of a position of the auxiliary device or an orientation of the auxiliary device, the identity of the operation further being a function of at least one of the position of the auxiliary device relative to a position of the mobile computing device or a change in the orientation of the auxiliary device.

Example 5

The method according to any of Examples 1-4, potential operations performable by the personal assistant component during a period of time comprise the operation, identities of the potential operations being tailored as a function of the context of the mobile computing device and a context of the auxiliary device during the period of time.

Example 6

The method according to any of Examples 1-5, the user input being a touch of a touch sensor of the auxiliary device.

Example 7

The method according to any of Examples 1-6, further comprising: receiving speech input at the auxiliary device, the speech input received by a microphone of the auxiliary device; and responsive to receipt of the speech input, transmitting the speech input from the auxiliary device to the mobile computing device, the identity of the operation further being a function of the speech input.

Example 8

An auxiliary device, the auxiliary device being wirelessly coupled with a mobile computing device, the auxiliary device comprising: a processor; and a memory that comprises components that are executable by the processor, the components comprising: an interface component that detects a user input at the auxiliary device, an operation executed by the mobile computing device being performed responsive to the user input, an identity of the operation being a function of: a context of the mobile computing device; the user input; whether the auxiliary device is mechanically attached to a disparate device, wherein the auxiliary device is removably attachable to the disparate device; and a type of the disparate device, if the auxiliary device is mechanically attached to the disparate device; and an transceiver component that transmits data indicative of the user input from the auxiliary device to the mobile computing device.

Example 9

The auxiliary device according to Example 8, wherein: the memory further comprises a connection detection component, the connection detection component: detects whether the auxiliary device is mechanically attached to the disparate device and, if mechanically attached, the type of the disparate device; and generates mechanical attachment data indicative of: whether the auxiliary device is mechanically attached to the disparate device; and the type of the disparate device, if the auxiliary device is mechanically attached to the disparate device; the transceiver component further transmits the mechanical attachment data from the auxiliary device to the mobile computing device.

Example 10

The auxiliary device according to any of Examples 8-9, the auxiliary device being interchangeably attachable to a plurality of types of disparate devices.

Example 11

The auxiliary device according to any of Examples 8-10, the disparate device being an automobile jacket, the automobile jacket being mechanically attachable to an automobile steering wheel.

Example 12

The auxiliary device according to any of Examples 8-10, the disparate device being the mobile computing device, the auxiliary device being mechanically attachable to the mobile computing device in a stowed configuration and an extended configuration, the auxiliary device being a kickstand in the extended configuration.

Example 13

The auxiliary device according to any of Examples 8-10, the disparate device being a sleeve, the sleeve being mechanically attachable to the mobile computing device, the auxiliary device being mechanically attachable to the sleeve in a stowed configuration and an extended configuration, the auxiliary device being a kickstand in the extended configuration.

Example 14

The auxiliary device according to any of Examples 8-13, the operation being performed by a personal assistant component executed by the mobile computing device.

Example 15

The auxiliary device according to any of Examples 8-14, wherein: the memory further comprises a position detection component that detects a position of the auxiliary device; the transceiver component transmits, from the auxiliary device to the mobile computing device, data indicative of the position of the auxiliary device; and the identity of the operation executed by the mobile computing device further being a function of the position of the auxiliary device.

Example 16

A system, comprising: a mobile computing device, comprising: a first processor; and a first memory that comprises components that are executable by the first processor, the components executable by the first processor comprising: a personal assistant component; a context identification component that detects contextual data indicative of a context of the mobile computing device; and a first transceiver component; and an auxiliary device that is wirelessly coupled with the mobile computing device, the auxiliary device comprising: a touch sensor; a second processor; and a second memory that comprises components that are executable by the second processor, the components executable by the second processor comprising: an interface component that detects a touch of the touch sensor, an identity of an operation controlled responsive to detection of the touch of the touch sensor being a function of the context of the mobile computing device; and a second transceiver component that transmits data indicative of the detection of the touch of the touch sensor from the auxiliary device to the mobile computing device; wherein the first transceiver component of the mobile computing device receives the data indicative of the detection of the touch of the touch sensor from the auxiliary device; and wherein the personal assistant component performs the operation responsive to receipt of the data indicative of the detection of the touch of the touch sensor.

Example 17

The system according to Example 16, the auxiliary device being removably attachable to the mobile computing device, the auxiliary device being mechanically attachable to the mobile computing device in a stowed configuration and an extended configuration, the auxiliary device being a kickstand in the extended configuration.

Example 18

The system according to Example 17, the identity of the operation controlled responsive to the detection of the touch of the touch sensor further being a function of whether the auxiliary device is mechanically attached to the mobile computing device.

Example 19

The system according to any of Examples 16-18, wherein: the mobile computing device is removably attachable to a dock; and when the mobile computing device is mechanically attached to the dock: the contextual data detected by the context identification component specifies that the mobile computing device is mechanically attached to the dock and a type of the dock; and the identity of the operation controlled responsive to the detection of the touch of the touch sensor further being a function of mechanical attachment of the mobile computing device to the dock and the type of the dock.

Example 20

The system according to any of Examples 16-19, further comprising: an automobile dock, the automobile dock comprising: an audio output jack; a magnetic clasp, the mobile computing device being removably attachable to the automobile dock via the magnetic clasp; and a wireless charging source, the wireless charging source charges the mobile computing device when mechanically attached.

Example 21

A system that operates an auxiliary device, the auxiliary device being wirelessly coupled with a mobile computing device, the system comprising: means for detecting a user input at the auxiliary device, an operation of a personal assistant component executed by the mobile computing device being performed responsive to the user input, an identity of the operation being a function of a context of the mobile computing device and the user input; and means for transmitting data indicative of the user input from the auxiliary device to the mobile computing device responsive to detection of the user input.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of operating an auxiliary device, the auxiliary device being wirelessly coupled with a mobile telephone, the method comprising:
   detecting a user input at the auxiliary device, an operation of a personal assistant component executed by the mobile telephone being performed responsive to the user input, an identity of a type of the operation performed responsive to the user input being a function of a context of the auxiliary device and the user input, wherein the context of the auxiliary device comprises whether the auxiliary device is mechanically attached to a disparate device and a type of the disparate device, if the auxiliary device is mechanically attached to the disparate device; and
   responsive to detection of the user input, transmitting data indicative of the user input from the auxiliary device to the mobile telephone.

2. The method of claim 1, further comprising:
obtaining contextual data indicative of the context of the auxiliary device; and
transmitting the contextual data from the auxiliary device to the mobile telephone.

3. The method of claim 2, the contextual data specifies that the auxiliary device is mechanically attached to the disparate device and ft the type of the disparate device, the disparate device differs from the mobile telephone.

4. The method of claim 2, the contextual data specifies at least one of a position of the auxiliary device or an orientation of the auxiliary device, the identity of the type of the operation further being a function of at least one of the position of the auxiliary device relative to a position of the mobile telephone or a change in the orientation of the auxiliary device.

5. The method of claim 2, the contextual data specifies whether the auxiliary device is in a stowed configuration or an extended configuration, the auxiliary device being a kickstand in the extended configuration.

6. The method of claim 1, the operation being from operations performable by the personal assistant component during a period of time, identities of types of the operations being tailored as a function of a context of the mobile telephone and the context of the auxiliary device during the period of time.

7. The method of claim 1, the user input being a touch of a touch sensor of the auxiliary device.

8. The method of claim 1, further comprising:
receiving speech input at the auxiliary device, the speech input received by a microphone of the auxiliary device; and
responsive to receipt of the speech input, transmitting the speech input from the auxiliary device to the mobile telephone, the identity of the type of the operation further being a function of the speech input.

9. An auxiliary device, the auxiliary device being wirelessly coupled with a mobile telephone, the auxiliary device comprising:
a processor; and
a memory that comprises computer-executable instructions that, when executed by the processor, cause the processor to perform acts including:
detecting a user input at the auxiliary device, an operation executed by the mobile telephone being performed responsive to the user input, an identity of the operation being a function of:
a context of the mobile telephone;
the user input;
whether the auxiliary device is mechanically attached to a disparate device, wherein the auxiliary device is removably attachable to the disparate device; and
a type of the disparate device, if the auxiliary device is mechanically attached to the disparate device; and
transmitting data indicative of the user input from the auxiliary device to the mobile telephone.

10. The auxiliary device of claim 9, the acts further including:
detecting whether the auxiliary device is mechanically attached to the disparate device and, if mechanically attached, the type of the disparate device;
generating mechanical attachment data indicative of:
whether the auxiliary device is mechanically attached to the disparate device; and
the type of the disparate device, if the auxiliary device is mechanically attached to the disparate device; and
transmitting the mechanical attachment data from the auxiliary device to the mobile telephone.

11. The auxiliary device of claim 9, the auxiliary device being interchangeably attachable to a plurality of types of disparate devices.

12. The auxiliary device of claim 9, the disparate device being an automobile jacket, the automobile jacket being mechanically attachable to an automobile steering wheel.

13. The auxiliary device of claim 9, the disparate device being the mobile telephone, the auxiliary device being mechanically attachable to the mobile telephone in a stowed configuration and an extended configuration, the auxiliary device being a kickstand in the extended configuration.

14. The auxiliary device of claim 9, the disparate device being a sleeve, the sleeve being mechanically attachable to the mobile telephone, the auxiliary device being mechanically attachable to the sleeve in a stowed configuration and an extended configuration, the auxiliary device being a kickstand in the extended configuration.

15. The auxiliary device of claim 9, the operation being performed by a personal assistant component executed by the mobile telephone.

16. The auxiliary device of claim 9, the acts further including:
detecting a position of the auxiliary device; and
transmitting, from the auxiliary device to the mobile telephone, data indicative of the position of the auxiliary device;
wherein the identity of the operation executed by the mobile telephone further being a function of the position of the auxiliary device.

17. A system, comprising:
a mobile telephone, comprising:
a first processor; and
a first memory that comprises first computer-executable instructions that, when executed by the first processor, cause the first processor to perform first acts including:
executing a personal assistant component; and
detecting contextual data indicative of a context of the mobile telephone, wherein the contextual data indicative of the context of the mobile telephone specifies at least one of a position of the mobile telephone, an orientation of the mobile telephone, a velocity at which the mobile telephone is moving, a direction of movement of the mobile telephone, or mechanically attachment data for the mobile telephone; and
an auxiliary device that is wirelessly coupled with the mobile telephone, the auxiliary device comprising:
a touch sensor;
a second processor; and
a second memory that comprises second computer-executable instructions that, when executed by the second processor, cause the second processor to perform second acts including:
detecting a touch of the touch sensor, an identity of a type of an operation controlled responsive to detection of the touch of the touch sensor being a function of the context of the mobile telephone; and
transmitting data indicative of the detection of the touch of the touch sensor from the auxiliary device to the mobile telephone;

wherein the first acts further include receiving, at the mobile telephone, the data indicative of the detection of the touch of the touch sensor from the auxiliary device; and wherein executing the personal assistant component further comprises causing the personal assistant component executed by the mobile telephone to perform the operation responsive to receipt of the data indicative of the detection of the touch of the touch sensor.

18. The system of claim 17, the auxiliary device being removably attachable to the mobile telephone, the auxiliary device being mechanically attachable to the mobile telephone in a stowed configuration and an extended configuration, the auxiliary device being a kickstand in the extended configuration.

19. The system of claim 18, the identity of the type of the operation controlled responsive to the detection of the touch of the touch sensor further being a function of whether the auxiliary device is mechanically attached to the mobile telephone.

20. The system of claim 17, wherein:

the mobile telephone is removably attachable to a dock; and when the mobile telephone is mechanically attached to the dock:

the contextual data detected by the mobile telephone specifies that the mobile telephone is mechanically attached to the dock and a type of the dock; and the identity of the type of the operation controlled responsive to the detection of the touch of the touch sensor further being a function of mechanical attachment of the mobile telephone to the dock and the type of the dock.

* * * * *